(12) United States Patent
Hibbard et al.

(10) Patent No.: US 8,577,107 B2
(45) Date of Patent: Nov. 5, 2013

(54) METHOD AND APPARATUS FOR EFFICIENT THREE-DIMENSIONAL CONTOURING OF MEDICAL IMAGES

(75) Inventors: Lyndon S. Hibbard, St. Louis, MO (US); Xiao Han, Chesterfield, MO (US)

(73) Assignee: IMPAC Medical Systems, Inc., Sunnyvale, CA (US)

( * ) Notice: Subject to any disclaimer, the term of this patent is extended or adjusted under 35 U.S.C. 154(b) by 0 days.

(21) Appl. No.: 13/295,525

(22) Filed: Nov. 14, 2011

(65) Prior Publication Data
US 2012/0057769 A1    Mar. 8, 2012

Related U.S. Application Data

(62) Division of application No. 11/848,624, filed on Aug. 31, 2007, now Pat. No. 8,098,909.

(51) Int. Cl.
*G06K 9/00*    (2006.01)

(52) U.S. Cl.
USPC ............................... 382/128; 128/922; 378/4

(58) Field of Classification Search
USPC ................ 382/100, 128, 129, 130, 131, 132; 128/922; 378/4–27; 345/418–427, 345/650–655
See application file for complete search history.

(56) References Cited

U.S. PATENT DOCUMENTS

| | | |
|---|---|---|
| 5,859,891 A | 1/1999 | Hibbard |
| 6,075,538 A | 6/2000 | Shu et al. |
| 6,112,109 A | 8/2000 | D'Urso |
| 6,142,019 A | 11/2000 | Venchiarutti et al. |
| 6,259,943 B1 | 7/2001 | Cosman et al. |
| 6,262,739 B1* | 7/2001 | Migdal et al. ............ 345/423 |
| 6,343,936 B1 | 2/2002 | Kaufman et al. |
| 6,606,091 B2 | 8/2003 | Liang et al. |
| 6,683,933 B2 | 1/2004 | Saito et al. |
| 6,947,584 B1 | 9/2005 | Avila et al. |
| 7,010,164 B2 | 3/2006 | Weese et al. |
| 7,110,583 B2 | 9/2006 | Yamauchi |
| 7,167,172 B2 | 1/2007 | Kaus et al. |
| 7,333,644 B2 | 2/2008 | Jerebko et al. |
| 7,428,334 B2* | 9/2008 | Schoisswohl et al. ........ 382/173 |
| 7,620,224 B2 | 11/2009 | Matsumoto |
| 8,098,909 B2 | 1/2012 | Hibbard et al. |
| 2005/0168461 A1 | 8/2005 | Acosta et al. |
| 2005/0231530 A1 | 10/2005 | Liang et al. |
| 2005/0276455 A1* | 12/2005 | Fidrich et al. ............ 382/128 |

(Continued)

OTHER PUBLICATIONS

Stefanescu, "Parallel Nonlinear Registration of Medical Images With a Priori Information on Anatomy and Pathology", PhD Thesis. Sophia-Antipolis: University of Nice, 2005, 140 pages.

(Continued)

*Primary Examiner* — Anand Bhatnagar
(74) *Attorney, Agent, or Firm* — Thompson Coburn LLP

(57) ABSTRACT

A technique is disclosed for generating a new contour and/or a 3D surface such as a variational implicit surface from contour data. In one embodiment, a point reduction operation is performed on data sets corresponding to any combination of transverse, sagittal, or coronal contour data prior to processing those data sets to generate a 3D surface such as a variational implicit surface. A new contour can also be generated by the intersection of this surface with an appropriately placed and oriented plane. In this manner, the computation of the variational implicit surface becomes sufficiently efficient to make its use for new contour generation practical.

24 Claims, 23 Drawing Sheets

(56) References Cited

U.S. PATENT DOCUMENTS

| | | |
|---|---|---|
| 2006/0147114 A1 | 7/2006 | Kaus et al. |
| 2006/0149511 A1 | 7/2006 | Kaus et al. |
| 2006/0159322 A1 | 7/2006 | Rinck et al. |
| 2006/0159341 A1 | 7/2006 | Pekar et al. |
| 2006/0177133 A1 | 8/2006 | Kee |
| 2006/0204040 A1 | 9/2006 | Freeman et al. |
| 2006/0256114 A1 | 11/2006 | Nielsen et al. |
| 2007/0014462 A1 | 1/2007 | Rousson et al. |
| 2007/0041639 A1 | 2/2007 | Von Berg et al. |
| 2007/0092115 A1 | 4/2007 | Usher et al. |
| 2007/0167699 A1 | 7/2007 | Lathuiliere et al. |
| 2009/0016612 A1 | 1/2009 | Lobregt et al. |
| 2009/0190809 A1 | 7/2009 | Han et al. |
| 2012/0057768 A1 | 3/2012 | Hibbard et al. |

OTHER PUBLICATIONS

Strang, "Introduction to Applied Mathematics", 1986, Wellesley, MA: Wellesley-Cambridge Press, pp. 242-262.

Thirion, "Image Matching as a Diffusion Process: An Analog with Maxwell's Demons", Med. Imag. Anal., 1998, pp. 243-260, vol. 2 (3).

Thomas, "Numerical Partial Differential Equations: Finite Difference Methods", Springer, New York, 1995.

Turk et al., "Shape Transformation Using Variational Implicit Functions", Proceedings of SIGGRAPH 99, Annual Conference Series, (Los Angeles, California), pp. 335-342, Aug. 1999.

Vemuri et al., "Joint Image Registration and Segmentation", Geometric Level Set Methods in Imaging, Vision, and Graphics, S. Osher and N. Paragios, Editors, 2003, Springer-Verlag, New York, pp. 251-269.

Wahba, "Spline Models for Observational Data", SIAM (Society for Industrial and Applied Mathematics), Philadelphia, PA, 1990.

Wang et al., "Validation of an Accelerated 'Demons' Algorithm for Deformable Image Registration in Radiation Therapy", Phys. Med. Biol., 2005, pp. 2887-2905, vol. 50.

Wolf et al., "ROPES: a Semiautomated Segmentation Method for Accelerated Analysis of Three-Dimensional Echocardiographic Data", IEEE Transactions on Medical Imaging, 21, 1091-1104, 2002.

Xing et al., "Overview of Image-Guided Radiation Therapy", Med. Dosimetry, 2006, pp. 91-•112, vol. 31 (2).

Xu et al., "Image Segmentation Using Deformable Models", Handbook of Medical Imaging, vol. 2, M. Sonka and J. M. Fitzpatrick, Editors, 2000, SPIE Press, Chapter 3.

Yezzi et al., "A Variational Framework for Integrating Segmentation and Registration Through Active Contours", Med. Imag. Anal., 2003, pp. 171-185, vol. 7.

Yoo, "Anatomic Modeling from Unstructured Samples Using Variational Implicit Surfaces", Proceedings of Medicine Meets Virtual Reality 2001, 594-600.

Young et al., "Registration-Based Morphing of Active Contours for Segmentation of CT Scans", Mathematical Biosciences and Engineering, Jan. 2005, pp. 79-96, vol. 2 (1).

Yushkevich et al., "User-Guided 3D Active Contour Segmentation of Anatomical Structures: Significantly Improved Efficiency and Reliability", NeuroImage 31, 1116-1128, 2006.

Zagrodsky et al., "Registration-Assisted Segmentation of Real-Time 3-D Echocardiographic Data Using Deformable Models", IEEE Trans. Med. Imag., Sep. 2005, pp. 1089-1099, vol. 24 (9).

Zeleznik et al., "SKETCH: An Interface for Sketching 3D Scenes", Proceedings of SIGGRAPH 96, 163-170, 1996.

Zhong et al., "Object Tracking Using Deformable Templates", IEEE Trans. Pall. Anal. Machine Intell., May 2000, pp. 544-549, vol. 22 (5).

Office Action for U.S. Appl. No. 13/295,494 dated Sep. 13, 2012.

International Search Report and Written Opinion for PCT/US2012/048938 dated Oct. 16, 2012.

Bookstein, "Principal Warps: Thin-Plate Splines and the Decomposition of Deformations", IEEE Transactions on Pattern Analysis and Machine Intelligence, Jun. 1989, pp. 567-585, vol. 11, No. 6.

Botsch et al., "On Linear Variational Surface Deformation Methods", IEEE Transactions on Visualization and Computer Graphics, 2008, pp. 213-230, vol. 14, No. 1.

Cruz et al., "A sketch on Sketch-Based Interfaces and Modeling", Graphics, Patterns and Images Tutorials, 23rd SIBGRAPI Conference, 2010, pp. 22-33.

De Berg et al., "Computational Geometry: Algorithms and Applications", 1997, Chapter 5, Springer-Verlag, New York.

Dice's coeffieient, Wikipedia, 1945.

Dinh et al., "Reconstructing Surfaces by Volumetric Regularization Using Radial Basis Functions", IEEE Transactions on Pattern Analysis and Machine Intelligence, Oct. 2002, pp. 1358-1371, vol. 24, No. 10.

Duchon, "Splines Minimizing Rotation-Invariant SBMI-NORMS in Soboley Spaces", 1977, Universite Scientifique et Medicale Laboratoire de Mathematiques Appliques, Grenoble France.

Gelas et al., "Variatonal Implicit Surface Meshing", Computers and Graphics, 2009, pp. 312-320, vol. 33.

Gering et al., "An Integrated Visualization System for Surgical Planning and Guidance using Image Fusion and Interventional Imaging", Int Conf Med Image Comput Assist Interv, 1999, pp. 809-819, vol. 2.

Girosi et al., "Priors, Stabilizers and Basis Functions: from regularization to radial, tensor and additive splines", Massachusetts Institute of Technology Artificial Intelligence Laboratory, Jun. 1993, 28 pages.

Ibanez et al., "The ITK Software Guide" Second Edition, 2005.

Jackowski et al., "A Computer-Aided Design System for Refinement of Segmentation Errors", MICCAI 2005, LNCS 3750, pp. 717-724.

Kalbe et al., "High-Quality Rendering of Varying Isosurfaces with Cubic Trivariate Cl-continuous Splines", ISVC 1, LNCS 5875, 2009, pp. 596-607.

Kaus et al., "Automated 3-D PDM Construction From Segmented Images Using Deformable Models", IEEE Transactions on Medical Imaging, Aug. 2003, pp. 1005-1013, vol. 22, No. 8.

Kho et al., "Sketching Mesh Deformations", ACM Symposium on Interactive 3D Graphics and Games, 2005, 8 pages.

Knoll et al., "Fast and Robust Ray Tracing of General Implicits on the GPU", Scientific Computing and Imaging Institute, University of Utah, Technical Report No. UUSCI-2007-014, 2007, 8 pages.

Leventon et al., "Statistical Shape Influence in Geodesic Active Contours", IEEE Conference on Computer Vision and Pattern Recognition, 2000, pp. 1316-1323.

Nealen et al., "A Sketch-Based Interface for Detail-Preserving Mesh Editing", Proceedings of ACM SIGGRAPH 2005, 6 pages, vol. 24, No. 3.

Osher et al., "Level Set Methods and Dynamic Implicit Surfaces", Chapters 11-13, 2003, Springer-Verlag, New York, NY.

Pieper et al., "The NA-MIC Kit: ITK, VTK, Pipelines, Grids and 3D Slicer as an Open Platform for the Medical Image Computing Community", Proceedings of the 3rd IEEE International Symposium on Biomedical Imaging: From Nano to Macro 2006, pp. 698-701, vol. 1.

Pohl et al., "A Bayesian model for joint segmentation and registration", NeuroImage, 2006, pp. 228-239, vol. 31.

Sapiro, "Geometric Partial Differential Equations and Image Analysis", Chapter 8, 2001, Cambridge University Press.

Schroeder et al., "The Visualization Toolkit", 2nd edition, Chapter 5, 1998, Prentice-Hall, Inc.

Singh et. al., "Real-Time Ray-Tracing of Implicit Surfaces on the GPU", IEEE Transactions on Visualization and Computer Graphics, 2009, pp. 261-272, vol. 99.

Tikhonov et al., "Solutions of III-Posed Problems", Introduction-Chapter 2, 1977, John Wiley & Sons.

Tsai et al, "A Shape-Based Approach to the Segmentation of Medical Imagery Using Level Sets", IEEE Transactions on Medical Imaging, Feb. 2003, pp. 137-154, vol. 22, No. 2.

Tsai et al., "An EM algorithm for shape classification based on level sets", Medical Image Analysis, 2005, pp. 491-502, vol. 9.

Notice of Allowance for U.S. Appl. No. 12/022,929 dated May 8, 2012.

Adelson et al., "Pyramid Methods in Image Processing", RCA Engineer, Nov./Dec. 1984, pp. 33-41, vol. 29-6.

Anderson et al., "LAPACK User's Guide", Third Edition, SIAM—Society for Industrial and Applied Mathematics, 1999, Philadelphia.

(56) References Cited

OTHER PUBLICATIONS

Barrett et al., "Interactive Live-Wire Boundary Extraction", Medical Image Analysis, 1, 331-341, 1997.
Bertalmio et al., "Morphing Active Countours", IEEE Trans. Patt. Anal. Machine Intell., 2000, pp. 733-737, vol. 22.
Bloomenthal, "An Implicit Surface Polygonizer", Graphics Gems IV, P Heckbert, Ed., Academic Press, New York, 1994.
Burnett et al., "A Deformable-Model Approach to Semi-Automatic Segmentation of CT Images Demonstrated by Application to the Spinal Canal", Med. Phys., Feb. 2004, pp. 251-263, vol. 31 (2).
Carr et al., "Reconstruction and Representation of 3D Objects with Radial Basis Functions", Proceedings of SIGGRAPH 01, pp. 67-76, 2001.
Carr et al., "Surface Interpolation with Radial Basis Functions for Medical Imaging", IEEE Transactions on Medical Imaging, 16, 96-107, 1997.
Cover et al., "Elements of Information Theory", Chapter 2, 1991, Wiley, New York, 33 pages.
Cover et al., "Elements of Information Theory", Chapter 8, 1991, Wiley, New York, 17 pages.
Davis et al., "Automatic Segmentation of Intra-Treatment CT Images for Adaptive Radiation Therapy of the Prostate", presented at 8th Int. Conf. MICCAI 2005, Palm Springs, CA, pp. 442-450.
DeBoor, "A Practical Guide to Splines", Springer, New York, 2001.
Digital Imaging and Communications in Medicine (DICOM), http://medical.nema.org/.
Dinh et al., "Reconstructing Surfaces by Volumetric Regularization Using Radial Basis Functions", IEEE Trans. Patt. Anal. Mach. Intell., 24, 1358-1371, 2002.
Dinh et al., "Texture Transfer During Shape Transformation", ACM Transactions on Graphics, 24, 289-310, 2005.
DoCarmo, "Differential Geometry of Curves and Surfaces", Prentice Hall, New Jersey, 1976.
Falcao et al., "An Ultra-Fast User-Steered Image Segmentation Paradigm: Live Wire on the Fly", IEEE Transactions on Medical Imaging, 19, 55-62, 2000.
Freedman et al., "Active Contours for Tracking Distributions", IEEE Trans. Imag. Proc., Apr. 2004, pp. 518-526, vol. 13 (4).
Gao et al., "A Deformable Image Registration Method to Handle Distended Rectums in Prostate Cancer Radiotherapy", Med. Phys., Sep. 2006, pp. 3304-3312, vol. 33 (9).
Gering et al., "An Integrated Visualization System for Surgical Planning and Guidance Using Image Fusion and an Open MR", Journal of Magnetic Resonance Imaging, 13, 967-975, 2001.
Gering, "A System for Surgical Planning and Guidance Using Image Fusion and Interventional MR", MS Thesis, MIT, 1999.
Golub et al., "Matrix Computations", Third Edition, The Johns Hopkins University Press, Baltimore, 1996.
Han et al., "A Morphing Active Surface Model for Automatic Re-Contouring in 4D Radiotherapy", Proc. of SPIE, 2007, vol. 6512, 9 pages.
Ho et al., "SNAP: A Software Package for User-Guided Geodesic Snake Segmentation", Technical Report, UNC Chapel Hill, Apr. 2003.
Huang et al., "Semi-Automated CT Segmentation Using Optic Flow and Fourier Interpolation Techniques", Computer Methods and Programs in Biomedicine, 84, 124-134, 2006.
Igarashi et al., "Smooth Meshes for Sketch-based Freeform Modeling" in ACM Symposium on Interactive 3D Graphics, (ACM I3D'03), pp. 139-142, 2003.
Igarashi et al., "Teddy: A Sketching Interface for 3D Freeform Design", Proceedings of SIGGRAPH 1999, 409-416.
Ijiri et al., "Seamless Integration of Initial Sketching and Subsequent Detail Editing in Flower Modeling", Eurographics 2006, 25, 617-624, 2006.
Jain et al., "Deformable Template Models: A Review", Signal Proc., 1998, pp. 109-129, vol. 71.
Jain, "Fundamentals of Digital Image Processing", Prentice-Hall, New Jersey, 1989.
Jehan-Besson et al., "Shape Gradients for Histogram Segmentation Using Active Contours", 2003, presented at the 9th IEEE Int. Conf. Comput. Vision, Nice, France, 8 pages.
Kalet et al., "The Use of Medical Images in Planning and Delivery of Radiation Therapy", J. Am. Med. Inf. Assoc., Sep./Oct. 1997, pp. 327-339, vol. 4 (5).
Karpenko et al., "Free-Form Sketching with Variational Implicit Surfaces", Computer Graphics Forum, 21, 585-594, 2002.
Karpenko et al., "SmoothSketch: 3D Free-Form Shapes From Complex Sketches", Proceedings of SIGGRAPH 06, pp. 589-598.
Leymarie et al., "Tracking Deformable Objects in the Plane Using an Active Contour Model", IEEE Trans. Patt. Anal. Machine Intell., Jun. 1993, pp. 617-634, vol. 15 (6).
Lipson et al., "Conceptual Design and Analysis by Sketching", Journal of AI in Design and Manufacturing, 14, 391-401, 2000.
Lorenson et al., "Marching Cubes: A High Resolution 3D Surface Construction Algorithm", Computer Graphics, Jul. 1987, pp. 163-169, vol. 21 (4).
Lu et al., "Automatic Re-Contouring in 4D Radiotherapy", Phys. Med. Biol., 2006, pp. 1077-1099, vol. 51.
Lu et al., "Fast Free-Form Deformable Registration Via Calculus of Variations", Phys. Med. Biol., 2004, pp. 3067-3087, vol. 49.
Marker et al., "Contour-Based Surface Reconstruction Using Implicit Curve Fitting, and Distance Field Filtering and Interpolation", The Eurographics Association, 2006, 9 pages.
Paragios et al., "Geodesic Active Contours and Level Sets for the Detection and Tracking of Moving Objects", IEEE Trans. Patt. Anal. Machine Intell., Mar. 2000, pp. 266-280, vol. 22 (3).
Pekar et al., "Automated Model-Based Organ Delineation for Radiotherapy Planning in Prostate Region", Int. J. Radiation Oncology Biol. Phys., 2004, pp. 973-980, vol. 60 (3).
Pentland et al., "Closed-Form Solutions for Physically Based Shape Modeling and Recognition", IEEE Trans. Patt. Anal. Machine Intell., Jul. 1991, pp. 715-729, vol. 13 (7).
Piegl et al., "The NURBS Book", Second Edition, Springer, New York, 1997.
Press et al., "Numerical Recipes in C", Second Edition, Cambridge University Press, 1992.
Rogelj et al., "Symmetric Image Registration", Med. Imag. Anal., 2006, pp. 484-493, vol. 10.
Sarrut et al., "Simulation of Four-Dimensional CT Images from Deformable Registration Between Inhale and Exhale Breath-Hold CT Scans", Med. Phys., Mar. 2006, pp. 605-617, vol. 33 (3).
Schmidt et al., ShapeShop: Sketch-Based Solid Modeling with Blob Trees, EUROGRAPHICS Workshop on Sketch-Based Interfaces and Modeling, 2005.
Schroeder et al., "The Visualization Toolkit", 2nd Edition, Kitware, 2006, Ch. 5 & 13, 65 pp.
Sethian, "Level Set Methods and Fast Marching Methods", 2nd ed., 1999, Cambridge University Press, Chapters 1, 2 & 6, 39 pages.

\* cited by examiner

METHOD AND APPARATUS FOR EFFICIENT THREE-DIMENSIONAL CONTOURING OF MEDICAL IMAGES

CROSS-REFERENCE AND PRIORITY CLAIM TO RELATED PATENT APPLICATIONS

This application is a divisional of U.S. patent application Ser. No. 11/848,624 filed Aug. 31, 2007, published as U.S. Pat. App. Pub. 2009/0060299, now U.S. Pat. No. 8,098,909, the entire disclosure of which is incorporated herein by reference.

This application is also related to U.S. patent application Ser. No. 13/295,494 filed this same day, which is a divisional U.S. patent application Ser. No. 11/848,624 filed Aug. 31, 2007, published as U.S. Pat. App. Pub. 2009/0060299, now U.S. Pat. No. 8,098,909.

FIELD OF THE INVENTION

The present invention pertains generally to the field of processing medical images, particularly generating contours for three-dimensional (3D) medical imagery.

BACKGROUND AND SUMMARY OF THE INVENTION

Contouring is an important part of radiation therapy planning (RTP), wherein treatment plans are custom-designed for each patient's anatomy. Contours are often obtained in response to user input, wherein a user traces the object boundary on the image using a computer workstation's mouse and screen cursor. However, it should also be noted that contours can also be obtained via automated processes such as auto-thresholding programs and/or auto-segmentation programs.

FIG. 1 depicts an exemplary GUI 100 through which a user can view and manipulate medical images. The GUI 100 includes frame 102 corresponding to the transverse (T) viewing plane, frame 104 corresponding to the coronal (C) viewing plane, and frame 106 corresponding to the sagittal (S) viewing plane. Within frame 102, an image slice of a patient that resides in a T plane can be viewed. Within frame 104, an image slice of a patient that resides in a C plane can be viewed. Within frame 106, an image slice of a patient that resides in an S plane can be viewed. Using well-known techniques, users can navigate from slice-to-slice and viewing plane-to-viewing plane within GUI 100 for a given set of image slices. It can also be noted that the upper right hand frame of GUI 100 depicts a 3D graphics rendering of the contoured objects.

FIG. 2(a) illustrates an exemplary patient coordinate system with respect to a radiotherapy treatment machine that is consistent with the patient coordinate system defined by the IEC 61217 Standard for Radiotherapy Equipment. As can be seen, the patient coordinate system is a right-hand coordinate system such that if a supine patient is lying on a treatment couch with his/her head toward the gantry, the positive x-axis points in the direction of the patient's left side, the positive y-axis points in the direction of the patient's head, and the positive z-axis points straight up from the patient's belly. The origin of this coordinate system can be offset to the origin of the image data under study.

FIG. 2(b) defines the T/S/C viewing planes with respect to the patient coordinate system of FIG. 2(a). As is understood, a plane in the T viewing plane (the xz-viewing plane) will have a constant value for y, a plane in the S viewing plane (the yz-viewing plane) will have a constant value for x, and a plane in the C viewing plane (the xy-viewing plane) will have a constant value for z.

Returning to the example of FIG. 1, the image data within GUI 100 depicts a patient's prostate 110, bladder 112, and rectum 114. As indicated above, an important part of RTP is the accurate contouring of regions of interest such as these.

Current RTP software typically limits contour drawing by the user through GUI 100 to T views (views which are perpendicular to the patient's long axis) as the T images usually have the highest spatial resolution, the T images are the standard representation of anatomy in the medical literature, and the T contours are presently the only format defined in the DICOM standard. The two other canonical views—the S and C views—can then be reconstructed from the columns and rows, respectively, of the T images.

When generating 3D surfaces from image slices, conventional software programs known to the inventor herein allow the user to define multiple T contours for a region of interest within an image for a plurality of different T image slices. Thereafter, the software program is used to linearly interpolate through the different T contours to generate a 3D surface for the region of interest. However, the inventor herein notes that it is often the case that a plane other than a T plane (e.g., planes within the S and/or C viewing planes) will often more clearly depict the region of interest than does the T plane. Therefore, the inventor herein believes there is a need in the art for a robust 3D contouring algorithm that allows the user to define input contours in any viewing plane (including S and C viewing planes) to generate a 3D surface for a region of interest and/or generate a new contour for the region of interest.

Further still, the inventor herein believes that conventional 3D surface generation techniques, particularly techniques for generating variational implicit surfaces, require unacceptably long computational times. As such, the inventor herein believes that a need exists in the art for a more efficient method to operate on contours in three dimensions.

Toward these ends, according to one aspect of an embodiment of the invention, disclosed herein is a contouring technique that increases the efficiency of 3D contouring operations by reducing the number of data points needed to represent a contour prior to feeding those data points to a 3D contouring algorithm, wherein the 3D contouring algorithm operates to generate a 3D surface such as a variational implicit surface or process the reduced data points to generate a new contour in a new plane via an interpolation technique such as B-spline interpolation. The data points that are retained for further processing are preferably a plurality of shape-salient points for the contour. In accordance with one embodiment, computed curvature values for the data points are used as the criteria by which to judge which points are shape-salient. In accordance with another embodiment, computed scalar second derivative values are used as the criteria by which to judge which points are shape-salient. In accordance with yet another embodiment, the DeBoor equal energy theorem is used as the criteria by which to judge which points are shape-salient.

According to another aspect of an embodiment of the invention, disclosed herein is a contouring technique that operates on a plurality of data points, wherein the data points define a plurality of contours corresponding to a region of interest within a patient, each contour being defined by a plurality of the data points and having a corresponding plane, wherein the plurality of data points are reduced as described above and processed to find the reduced data points that intersect a new plane, and wherein B-spline interpolation is used to interpolate through the points of intersection to generate a new contour in the new plane. This embodiment can operate on a plurality of contours drawn by a user in the S and/or C viewing planes to generate a T contour in a desired T plane. The point reduction operation performed prior to the B-spline interpolation improves the efficiency of the B-spline interpolation operation.

While various advantages and features of several embodiments of the invention have been discussed above, a greater understanding of the invention including a fuller description of its other advantages and features may be attained by referring to the drawings and the detailed description of the preferred embodiment which follow.

DETAILED DESCRIPTION OF THE PREFERRED EMBODIMENTS

Figure 1:
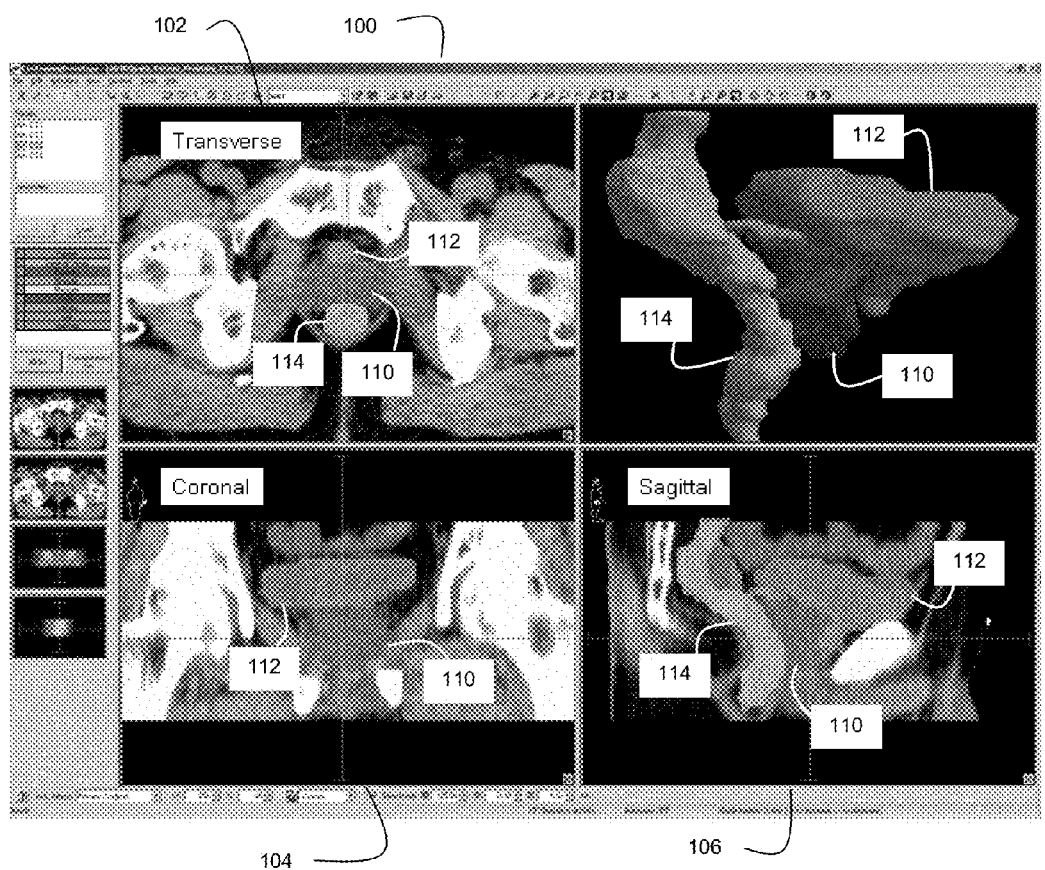
FIG. 1 depicts an exemplary graphical user interface (GUI) for a contouring program, wherein the GUI displays 3D patient Computed Tomography (CT) data in separate planar views.
Figure 2A:
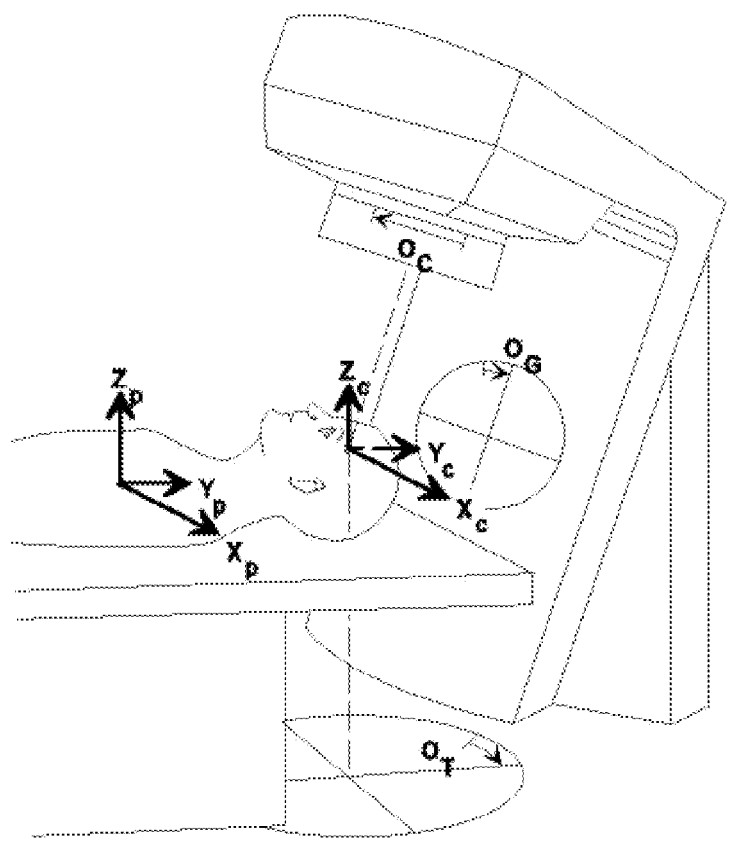
FIG. 2(a) depicts an exemplary patient coordinate system with respect to a radiotherapy treatment machine.
Figure 2B:
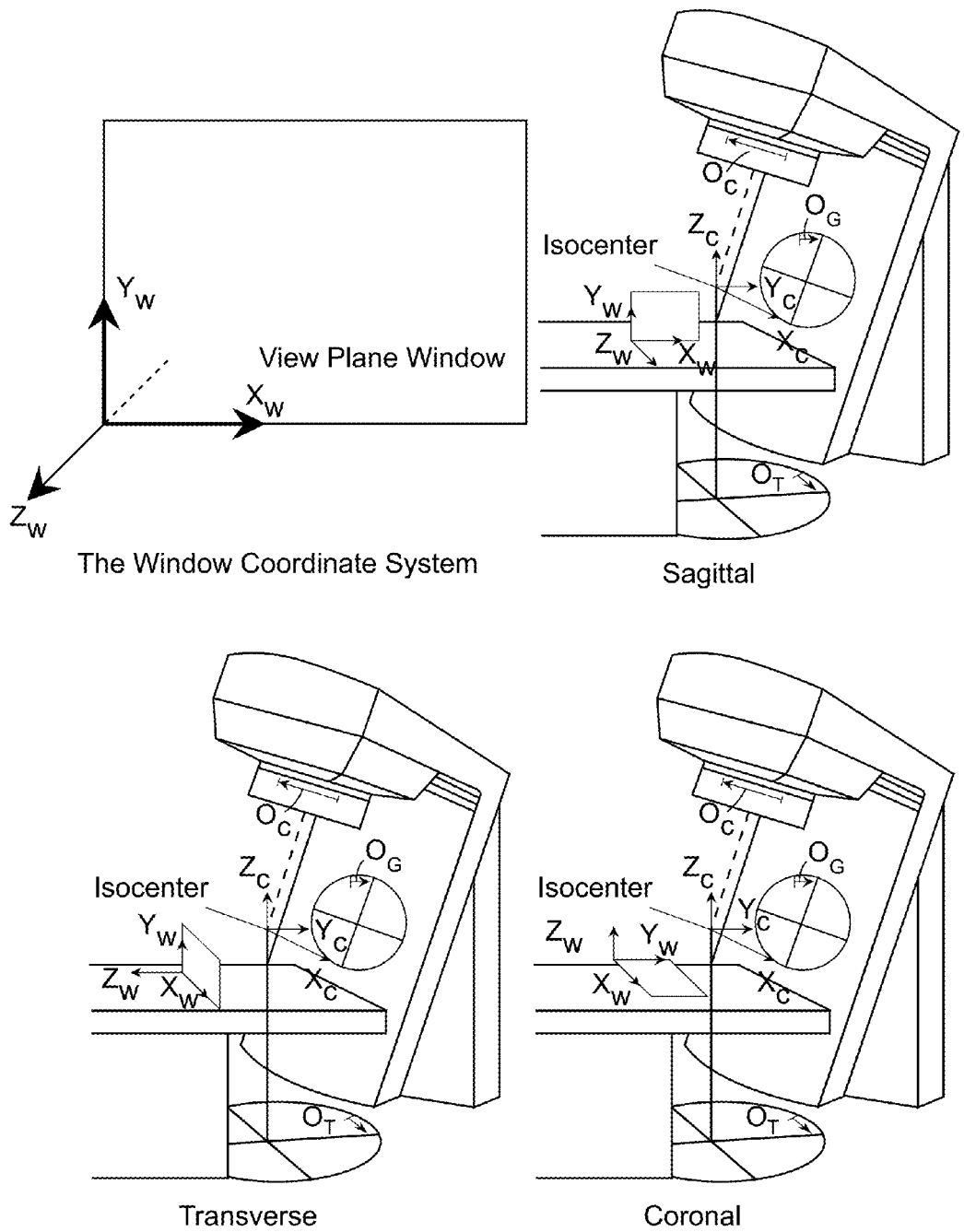
FIG. 2(b) depicts the T, S, and C view planes for the patient coordinate system of FIG. 2(a)

I. Contours:

The embodiments of the present invention address contours. Contours are planar, closed curves C(x,y,z) which can be realized as sets of non-uniformly sampled points along the user-input stroke, $\{c_1, \ldots, c_M\}$ (or sets of points generated by an auto-thresholding and/or auto-segmentation program), wherein the individual points are represented by $c_i = C(x_i, y_i, z_i)$, and wherein M is the number of points in the contour. Points $c_i$ in the T planes (xz-planes) have y constant, S contours (yz-planes) have x constant, and C contours (xy-planes) have z constant.

Contours can also be parameterized by a curve length u where the curve C of length L is represented as $C(x,y,z)=C(x(u),y(u),z(u))=C(u)$ where $0 \leq u \leq L$ and $C(0)=C(L)$.

II. B-Spline Representation of Contours:

When contours exist as discrete points as noted above, it can be useful to represent these points as samples on a continuous curve along which one can interpolate the contour shape at any arbitrary point. B-splines, which can specify arbitrary curves with great exactness, can provide such a representation for contours. (See Piegl, L. A., and Tiller, W., *The Nurbs Book*, Springer, New York, 1996, the entire disclosure of which is incorporated herein by reference). The B-spline description of a curve depends on (1) a set of predefined basis functions, (2) a set of geometric control points, and (3) a sequence of real numbers (knots) that specify how the basis functions and control points are composed to describe the curve shape. Given this information, the shape of C(u) can be computed at any u. Alternatively, given points u' sampled along C(u), one can deduce a set of B-spline control points and corresponding knots that reconstruct the curve to arbitrary accuracy. Thus, B-splines can be used to interpolate curves or surfaces through geometric points or to approximate regression curves through a set of data points.

B-splines form piecewise polynomial curves along u, delimited by the knots $u_i, i=0, \ldots, m$ into intervals in which subsets of the basis functions and the control points define C(u). The m+1 knots $U=\{u_0, \ldots, u_m\}$ are a non-decreasing sequence of real numbers such that $u_i \leq u_{i+1}$, for all i.

The p-th degree B-spline basis function, $N_{i,p}(u)$, defined for the i-th knot interval, defines the form of the interpolation. The zero-th order function, $N_{i,0}(u)$, is a step function and higher orders are linear combinations of the lower order functions. The construction of basis functions by recursion is described in the above-referenced work by Piegl and Tiller. A preferred embodiment of the present invention described herein employs cubic (p=3) B-splines.

Basis function $N_{i,p}(u)$ is nonzero on the half-open interval $[u_i, u_{i+p+1})$, and for any interval $[u_i, u_{i+1})$ at most (p+1) of the basis functions, $N_{i-p,p}(u), \ldots, N_{ix,p}(u)$, are nonzero. A p-th degree, open B-spline curve C(u) with end points u=a,b is defined by $$C(u) = \sum_{i=0}^{n} N_{i,p}(u)P_i, \quad a \le u \le b \qquad (1)$$

where the $P_i$ are the (n+1) control points, the $N_{i,p}(u)$ are the basis functions, and the knot vector U is defined $$U = \{\underbrace{a, \ldots, a}_{p+1}, u_{p+1}, \ldots, u_{m-p-1}, \underbrace{b, \ldots, b}_{p+1}\} \qquad (2)$$

where $a \le u_{p+1} \le u_{p+2}, \ldots \le u_{m-p-1} \le b$. This defines an unclosed curve with multiple knots at the end values $a=u_0, \ldots, u_p$; $b=u_{m-p}, \ldots, u_m$. For a spline of degree p with m+1 knots, n+1 control points will be required to specify the shape; for all spline geometries p,n,m are related as $$m = n + p + 1. \qquad (3)$$

Closed curves with coincident start and end points and with $C^2$ continuity (continuous curve with continuous first and second derivatives) throughout are defined with uniform knot vectors of the form $U=\{u_0, u_1, \ldots, u_m\}$ with n+1(=m−p) control points defined such that the first p control points $P_0$, $P_1, \ldots, P_{p-1}$ are replicated as the last p control points $P_{n-p-1}, \ldots, P_n$ which for the cubic (p=3) case means that $P_0=P_{n-2}$, $P_1=P_{n-1}$, $P_2=P_n$. This means that there are actually n+1−p unique control points, and that the knots that are actually visualizable on a closed curve are the set $u_p, u_{p+1}, \ldots, u_{m-p-1}$.

Figure 3:
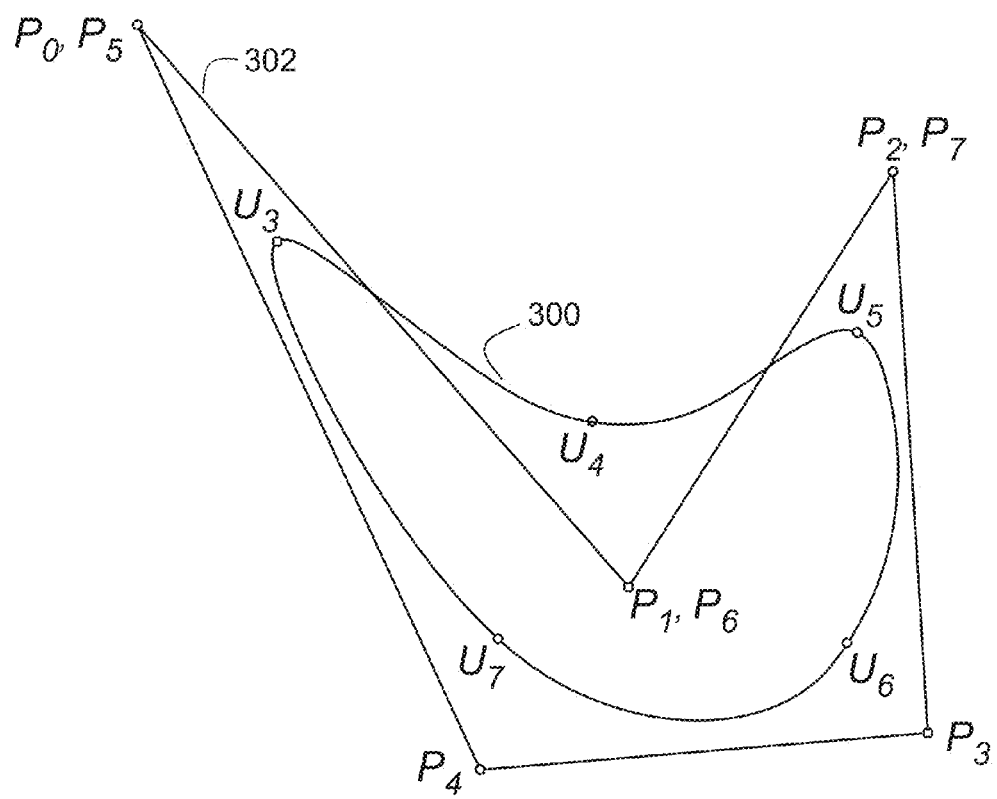
FIG. 3 depicts an exemplary contour specified by cubic B-splines.

FIG. 3 shows an exemplary continuous closed curve 300 specified by cubic (p=3) B-splines. Curve 300 is defined by five unique control points $P_0, P_1, \ldots, P_4$ as shown at the vertices of polygon 302. To generate a closed curve with $C^2$ continuity everywhere, p=3 of the control points are replicated, making n=7, and since m=n+p+1, then m+1=12 uniformly spaced knots are required, given by the vector

U=(0,1,2,3,4,5,6,7,8,9,10,11)

For fixed p,n,U, the curve shape 300 can be changed by moving one or more of the control points P. The locations of the knots are shown as dots on curve 300, wherein the knots $u_3$-$u_7$ uniquely span the curve, wherein knots $u_0$-$u_2$ coincide with knots $u_5$-$u_7$, and wherein knots $u_8$-$u_{11}$ coincide with knots $u_3$-$u_6$. Thus, as with the control points that must be duplicated for cyclic B-spline curves, so too must some of the knots be duplicated.

III. B-Spline Interpolation of Points in Contours:

A useful application of B-splines is to interpolate a smooth curve through a series of isolated points that represent samples of a curve. Global interpolation can be used to determine a set of control points given all the data in the input curve. (See Chapter 9 of the above-referenced work by Piegl and Tiller). Suppose one starts with a set of points $\{Q_k\}$, k=0, \ldots, n on the actual curve, and the goal is to interpolate through these points with a p-degree B-spline curve. Assigning a parameter value $\bar{u}_k$ to each $Q_k$ and selecting an appropriate knot vector $U=\{u_0, \ldots, u_n\}$, one can then set up the (n+1)×(n+1) system of linear equations $$Q_k = C(\bar{u}_k) = \sum_{i=0}^{n} N_{i,p}(\bar{u}_k)P_i \qquad (4)$$

where the n+1 control points $P_i$ are the unknowns. The system can be re-written as $$Q = AP \qquad (5)$$

where the Q,P are column vectors of the $Q_k$ and $P_i$, respectively, and where A is the matrix of basis functions. This (n+1)×(n+1) linear system can be solved for the unknown control points $P_i$ $$P = A^{-1}Q \qquad (6)$$

by factoring A by LU decomposition instead of inverting matrix A. (See Press, et al., *Numerical Recipes in C, 2nd Edition*, Cambridge University Press, 1992; Golub, G. H. and Van Loan, C. F., *Matrix Computations*, The Johns Hopkins University Press, Baltimore, 1996, the entire disclosures of both of which are incorporated herein by reference). A higher quality reconstruction—end points joined with $C^2$ continuity—can be obtained by restricting curves to cubic (p=3) type and by specifying endpoint first derivatives. Defining the endpoint tangent vectors $D_0$ at $Q_0$ and $D_n$ at $Q_n$, one constructs a linear system like equation (5) but with two more variables to encode the tangent information resulting in a (n+3)×(n+3) system. The tangents are added to the system with the equations $$P_0 = Q_0 \qquad (7)$$
$$-P_0 + P_1 = \frac{u_4}{3} D_0$$
$$-P_{n+1} + P_{n+2} = \frac{1 - u_{n+2}}{3} D_n$$
$$P_{n+2} = Q_n$$

that can be used to construct a tridiagonal system $$\begin{bmatrix} Q_1 - a_1 P_1 \\ Q_2 \\ \vdots \\ Q_{n-2} \\ Q_{n-1} - c_{n-1} P_{n+1} \end{bmatrix} = \begin{bmatrix} b_1 & c_1 & 0 & \ldots & 0 & 0 & 0 \\ a_2 & b_2 & c_2 & \ldots & 0 & 0 & 0 \\ \vdots & \vdots & \vdots & \ddots & \vdots & \vdots & \vdots \\ 0 & 0 & 0 & \ldots & a_{n-2} & b_{n-2} & c_{n-2} \\ 0 & 0 & 0 & \ldots & 0 & a_{n-1} & b_{n-1} \end{bmatrix} \begin{bmatrix} P_2 \\ P_3 \\ \vdots \\ P_{n-1} \\ P_n \end{bmatrix} \qquad (8)$$

that can be solved by Gaussian elimination. (See Chapter 9.2.3 of the above-referenced work by Piegl and Tiller).

Figure 4:
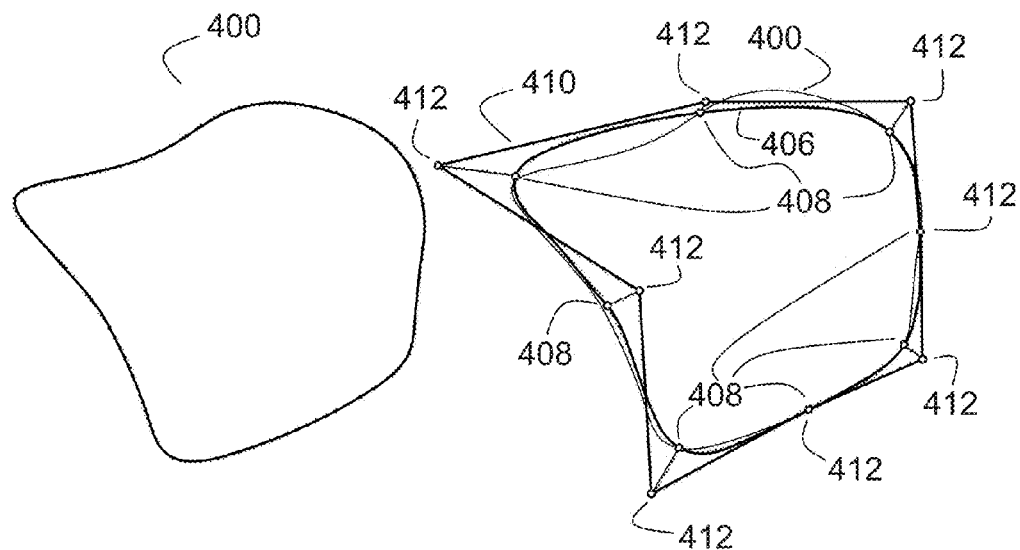
FIG. 4 depicts an exemplary contour and its approximation using cubic B-spline interpolation using eight points on the original contour.

To demonstrate the interpolation of points representing a putative curve, the inventor has sampled points from closed curves with random, but known, shapes, and reconstructed the random curves measuring the accuracy as the mean squared error of the reconstructed curve versus the original. FIG. 4 shows an example of a contour 400 from which eight $Q_k$ points were selected, and from which a set of control points 412 was computed using equation (8). Contour 400 represents a randomly-generated shape, wherein this shape is approximated by contour 406 based on cubic B-spline interpolation through eight points $Q_k$ on the original contour 400. Shown at right in FIG. 4 is a superposition of the approximated contour 406 over the original contour 400. Also shown at right in FIG. 4 is the geometric polygon representation 410 of the spline reconstruction, wherein the newly-determined control points are the vertices 412 of polygon 410, and wherein the knots 408 on the new curve 406 are connected by the line segments to the control points 412. In this example, there are 11 (which equals (n+1)) actual control points 412, which include eight unique control points and the p replicates. Because m=n+p+1=10+3+1=14, the knot vector requires m+1=15 elements for which one can define a uniform (equal knot intervals) knot vector, U=(0,1,2,3,4,5,6,7,8,9,10,11,12, 13,14), which is the usual knot configuration for closed curves.

Figure 5A:
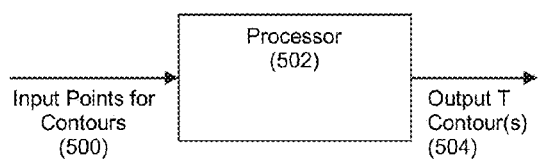
FIGS. 5(a) and (b) depict exemplary computing environments on which embodiments of the present invention can be realized.
Figure 5B:
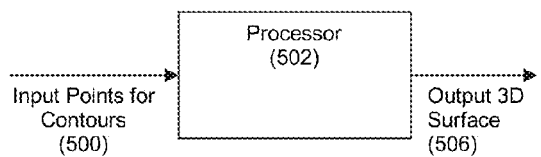

IV. Embodiments of the Invention:

FIGS. 5(a) and 5(b) depict exemplary computing environments in which embodiments of the present invention can be realized. Preferably, a processor 502 is configured to execute a software program to carry out the three-dimensional contouring operations described herein. Such a software program can be stored as a set of instructions on any computer-readable medium for execution by the processor 502. The processor 502 receives as inputs a plurality of data points 500, wherein these input data points 500 are representative of a plurality of contours. These input points can be defined manually by a computer user (e.g., by dragging a mouse cursor over a desired shape to define points for an input contour) or automatically by an auto-thresholding and/or auto-segmentation process, as would be understood by those having ordinary skill in the art.

In the embodiment of FIG. 5(a), the input points 500 are representative of a plurality of contours that reside in at least one viewing plane. Preferably, these contours are a plurality of S contours, a plurality of C contours, or some combination of at least one S contour and at least one C contour. Furthermore, as described hereinafter, the software program executed by processor 502 is preferably configured to generate one or more output contours 504 from the input points 500, wherein the output contour(s) 504 reside in a viewing plane that is non-parallel to the at least one viewing plane for the contours of the input points 500. Preferably, the output contour(s) 504 is/are T contour(s).

Figure 6:
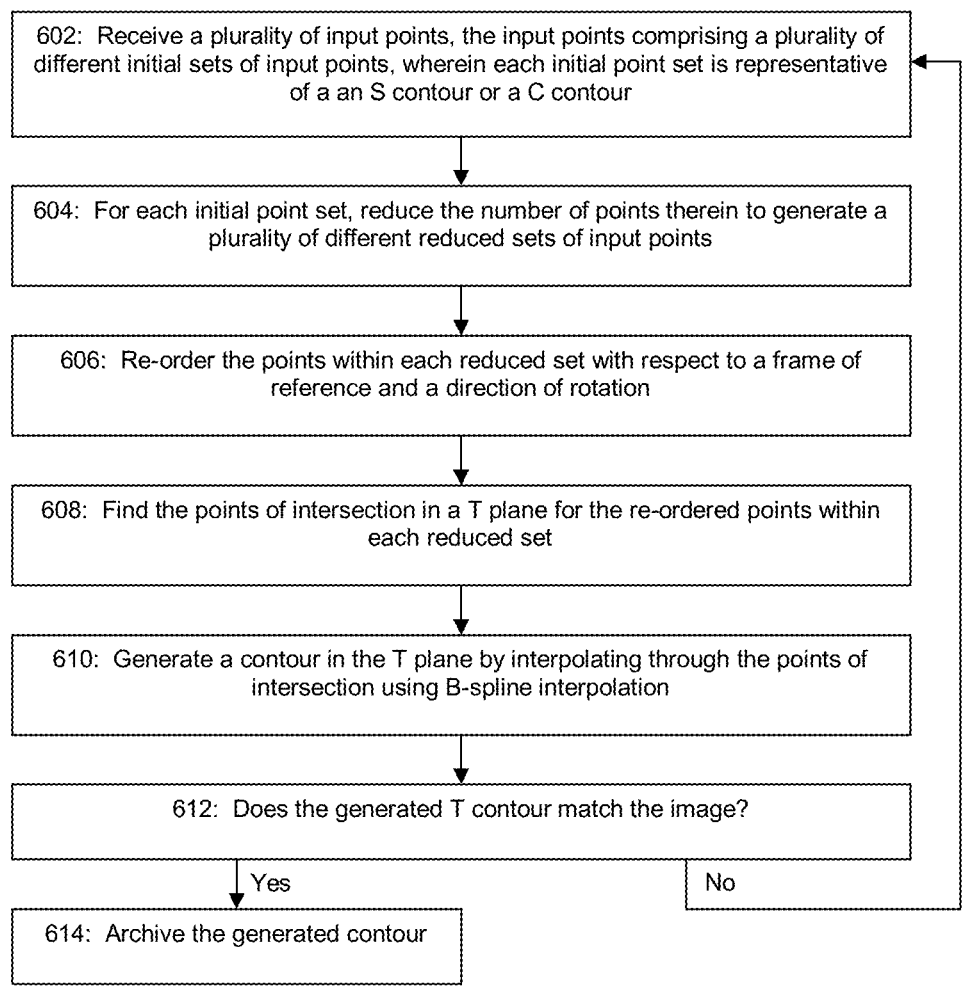
FIG. 6 depicts an exemplary process flow for generating a new contour from a plurality of input points that represent contours.

FIG. 6 depicts an exemplary process flow for the FIG. 5(a) embodiment. At step 602, the software program receives the plurality of input data points 500. These input points 500 can be grouped as a plurality of different initial sets of data points, wherein each initial point set is representative of a different contour, the different contours existing in at least one viewing plane. As explained above, these contours preferably comprise (1) a plurality of S contours, (2) a plurality of C contours, or (3) at least one S contour and at least one C contour.

One observation that can be made from FIG. 4 is that the reconstructed contour 406 does not match the original contour 400 everywhere. The fit could be improved by sampling more points on the original contour 400, and, in the limit of all available points on the original contour 400, the cubic B-spline reconstruction would be exact. However, the inventor herein notes that some points corresponding to the original contour 400 ought to be more important to contour shape than others—e.g., points at u where the curvature is large should convey more shape information than any other points. Thus, in the interest of increasing the efficiency with which B-spline interpolation can be performed and with which interpolated contours can be represented through data, the inventor herein notes that B-spline interpolation need not be performed on all of the input points 500 for a given contour. Instead, the input points 500 in a given set of input points can be processed to generate a reduced set of input points on which the B-spline interpolation will be performed (step 604). Preferably, step 604 operates to reduce the number of input points 500 for a given contour by generating a reduced set of input points, wherein the reduced set comprises a plurality of shape-salient points. As used herein, points which are representative of a contour are considered "shape-salient" by applying a filtering operation based on a shape-indicative metric to those points, examples of which are provided below.

The inventor herein discloses three techniques that can be used to reduce the data points 500 to a plurality of shape-salient points.

According to a first technique of point reduction for step 604, the shape-salient points for each initial input point set are determined as a function of computed curvature values for a contour defined by the points 500 within that initial input point set. The curvature is representative of the speed at which curve C(u) changes direction with respect to increasing u, wherein u represents the distance along curve C(u) beginning from an arbitrary starting point or origin. The curvature of a plane curve is defined as:

$$\kappa = \frac{x'y'' - y'x''}{[x'^2 + y'^2]^{\frac{3}{2}}}, \quad (9)$$

where $x'=dx/du$, $x''=d^2x/du^2$, etc. are derivatives computed by finite differences on uniform u-intervals along C(u), and where the x,y values correspond to points which are representative of the input contour. (See DoCarmo, M., *Differential Geometry of Curves and Surfaces*, Prentice Hall, New York, 1976; Thomas, J. W., *Numerical Partial Differential Equations—Finite Difference Methods*, Springer, New York, 1995, the entire disclosures of which are incorporated herein by reference).

Preferably, step 604 takes points u* at peak values of $\kappa(u)$ $$u^* = \arg\max_u \kappa(u) \quad (10)$$

These points u*, which contribute most importantly to the shape of a curve, are saved for reconstruction of the contour through B-spline interpolation. It should be noted that because of the cyclic nature of the data in u (since 0≤u≤L and C(0)=C(L)), when computing the argmax function over intervals u, one can let the intervals span the origin 0 and then reset the computation for intervals placed at L+a to a or −a to L−a. To accomplish the use of uniform intervals u along C(u), one can (1) reconstruct each input contour via B-spline interpolation through all of its raw input points, (2) step along the reconstructed contour in equal size steps that are smaller than the normal spacing among the raw input points to generate the points which are fed to the curvature computation of formula (9), and (3) apply the curvature computations of formulas (9) and (10) to thereby generate a set of reduced points from the original set of raw input points.

Figure 7:
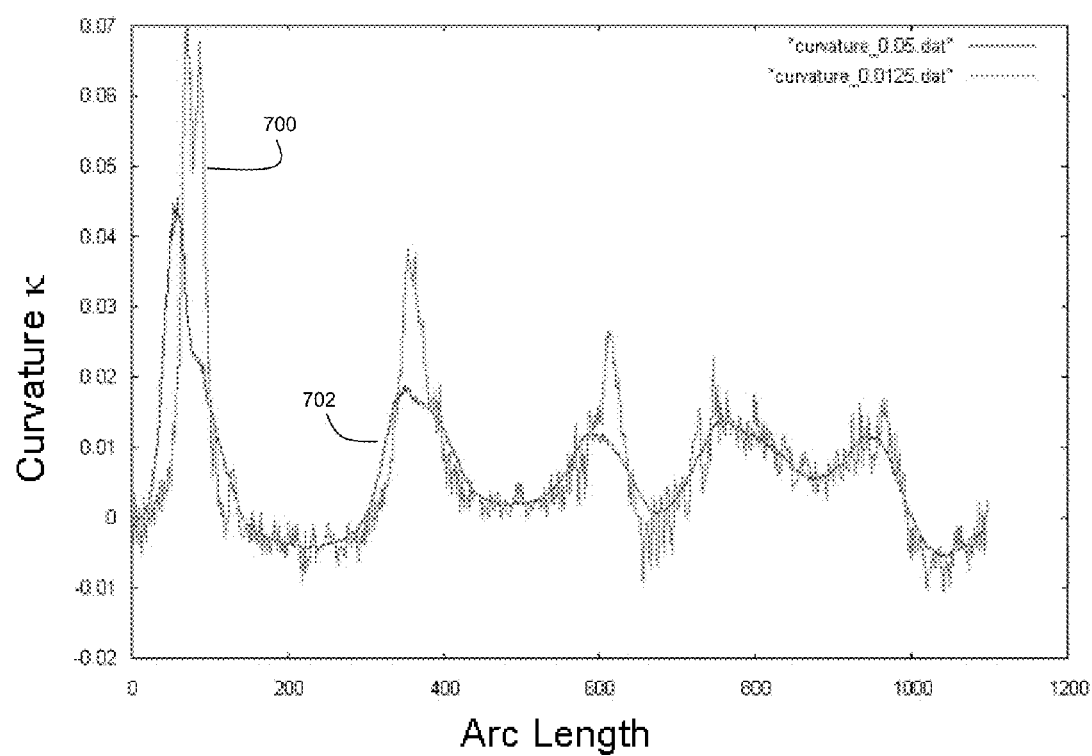
FIG. 7 depicts a plot of curvature versus arc length for sampled points from the exemplary contour of FIG. 4 for two finite difference interval settings.

FIG. 7 shows plots of curvature versus arc length u for two settings of the finite difference interval for the random contour 400 of FIG. 4. Plot 700 shows the curvature versus arc length for finite differences over 1.25% of the total curve length, and plot 702 shows the curvature versus arc length for a finite differences of over 5.0% of the total curve length. By varying this interval size, one may detect more or fewer peaks along arc length u; the longer the interval, the more apparent smoothing of the shape, thereby resulting in only the most prominent peaks being detected. For example, in plot 702, only the most prominent directional changes are apparent, leading to a selection of twelve unique $Q_k$ points for the B-spline interpolation analysis. It should also be noted that rather than using only maxima, step 604 can also be configured to retain only those points for which the computed curvature value exceeds a threshold value. As such, it can be seen that a variety of conditions can be used for determining how the curvature values will be used to define the shape-salient points.

Figure 8:
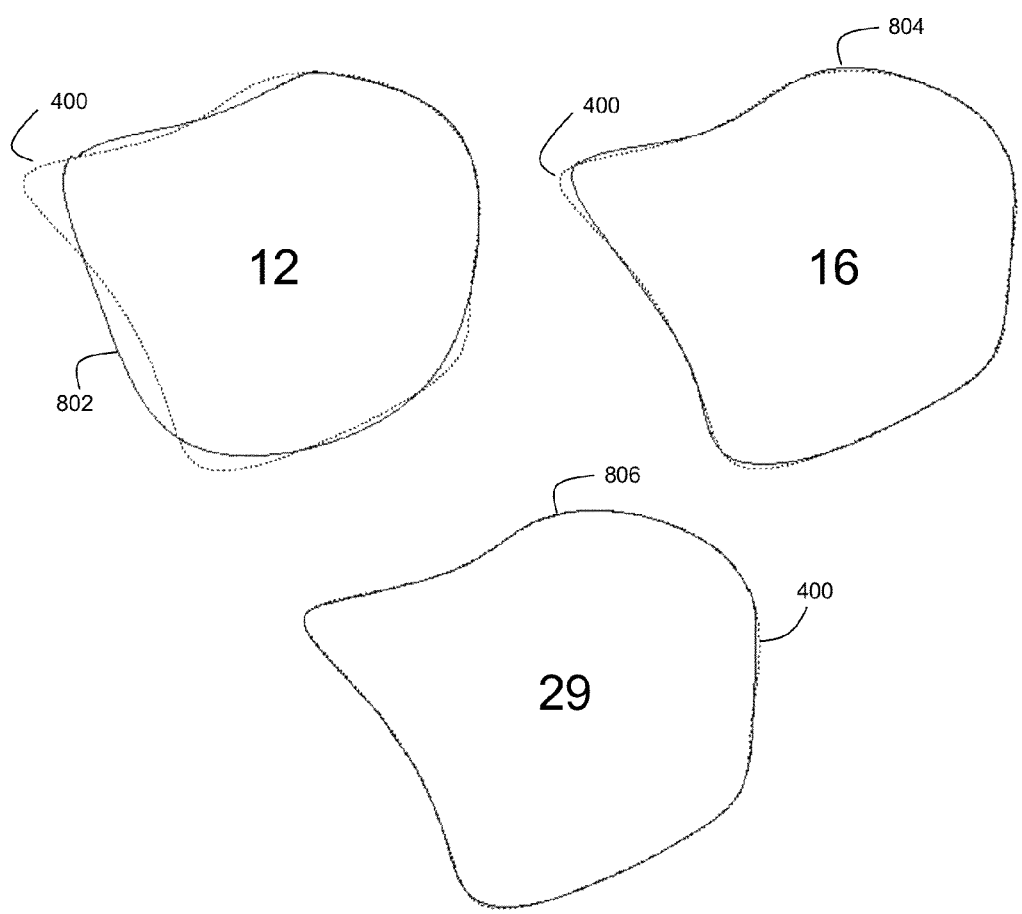
FIG. 8 depicts the exemplary contour of FIG. 4 reconstructed using B-spline interpolation for several different finite difference interval settings with respect to the curvature computation.

FIG. 8 shows the random shape 400 of FIG. 4 (shown with dotted lines in FIG. 8) reconstructed using B-spline interpolation for several interval settings. The number of points $Q_k$ for each reconstruction is set by the value of the finite distance interval and also depends on the shape complexity of the curve. For reconstructed contour 802, the number of points $Q_k$ was 12. For reconstructed contour 804, the number of points $Q_k$ was 16. For reconstructed contour 806, the number of points $Q_k$ was 29. As can be seen from FIG. 8, by using more points $Q_k$, it is possible to achieve arbitrarily high accuracy. However, it should also be noted that given the original number of samples for this example (a total of 1,099 samples), the use of only 29 points represents a significant compression in the number of points $Q_k$ used for the B-spline interpolation while still providing good accuracy in the reconstruction. Optionally, user input can be used to define a setting for the finite difference interval used in the curvature computations. Thus, the finite difference interval size in the curvature calculation can serve as an adjustable tuning parameter which can be controlled to define a quality and efficiency for the contour reconstruction.

According to a second technique of point reduction for step 604, the shape-salient points for each initial input point set are determined as a function of computed scalar second derivative a values (i.e., the scalar acceleration) for the motion of a point along C(u), which is defined as $$a(u) = \left[\left(\frac{d^2 x(u)}{du^2}\right)^2 + \left(\frac{d^2 y(u)}{du^2}\right)^2\right]^{\frac{1}{2}} \quad (11)$$

Preferably, step 604 takes points u* at peak values of a(u), $$u^* = \arg\max_u a(u) \quad (12)$$

Once again, the derivatives can be computed by finite differences on uniform u-intervals along C(u). Also, as noted above, because of the cyclic nature of the data in u (since 0≤u≤L and C(0)=C(L)), when computing the argmax function over intervals u, one can let the intervals span the origin 0 and then reset the computation for intervals placed at L+a to a or −a to L−a. As with the curvature calculations described above, to accomplish the use of uniform intervals u along C(u), one can (1) reconstruct each input contour via B-spline interpolation through all of its raw input points, (2) step along the reconstructed contour in equal size steps that are smaller than the normal spacing among the raw input points to generate the points which are fed to the scalar second derivative computation of formula (11), and (3) apply the scalar second derivative computation of formulas (11) and (12) to thereby generate a set of reduced points from the original set of raw input points.

Figure 9:
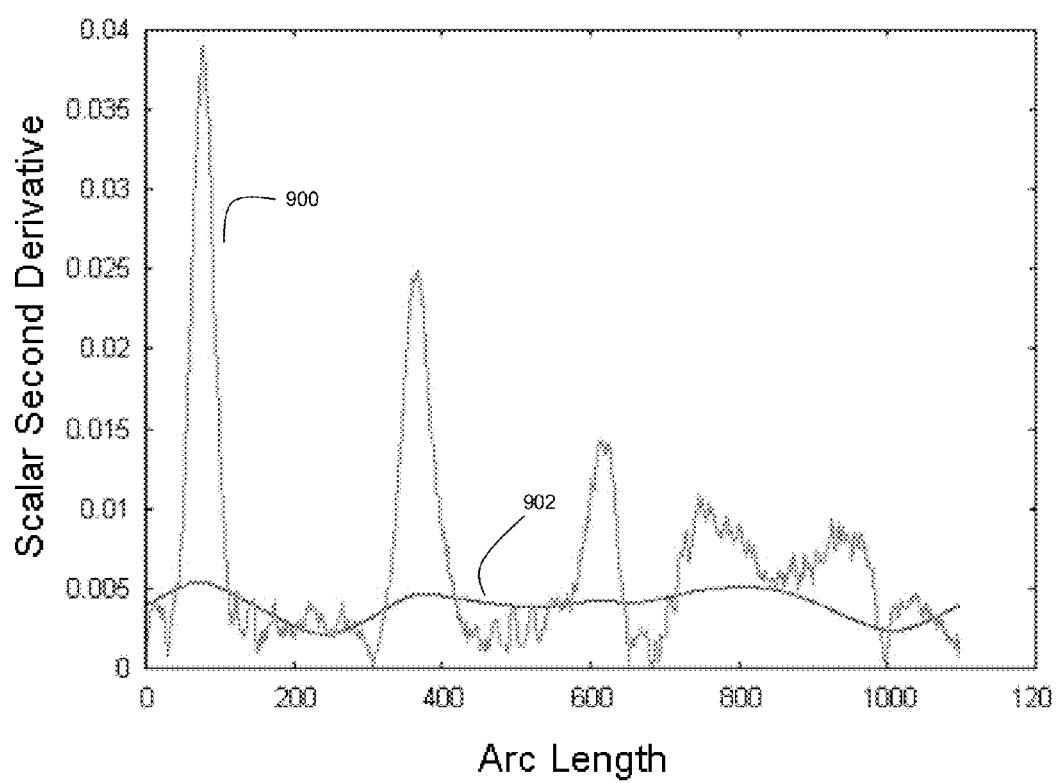
FIG. 9 depicts plots of scalar second derivative versus arc length for two settings of the finite difference interval for the exemplary contour of FIG. 4.

FIG. 9 shows plots of scalar second derivative versus arc length u for two settings of the finite difference interval for the random contour 400 of FIG. 4. Plot 900 shows the scalar second derivative versus arc length for finite differences over 5.0% of the total curve length, and plot 902 shows the scalar second derivative versus arc length for a finite differences of over 20.0% of the total curve length. As with the curvature method exemplified by FIG. 7, by varying the finite difference interval size, one may detect more or fewer peaks along arc length u; the longer the interval, the more apparent smoothing of the shape, thereby resulting in only the most prominent peaks being detected. Therefore, plot 902 would be expected to produce fewer $Q_k$ points than plot 900.

It should also be noted that rather than using only maxima, step 604 can also be configured to retain only those points for which the computed scalar second derivative exceeds a threshold value. As such, it can be seen that a variety of conditions can be used for determining how the scalar second derivative values will be used to define the shape-salient points.

Figure 10:
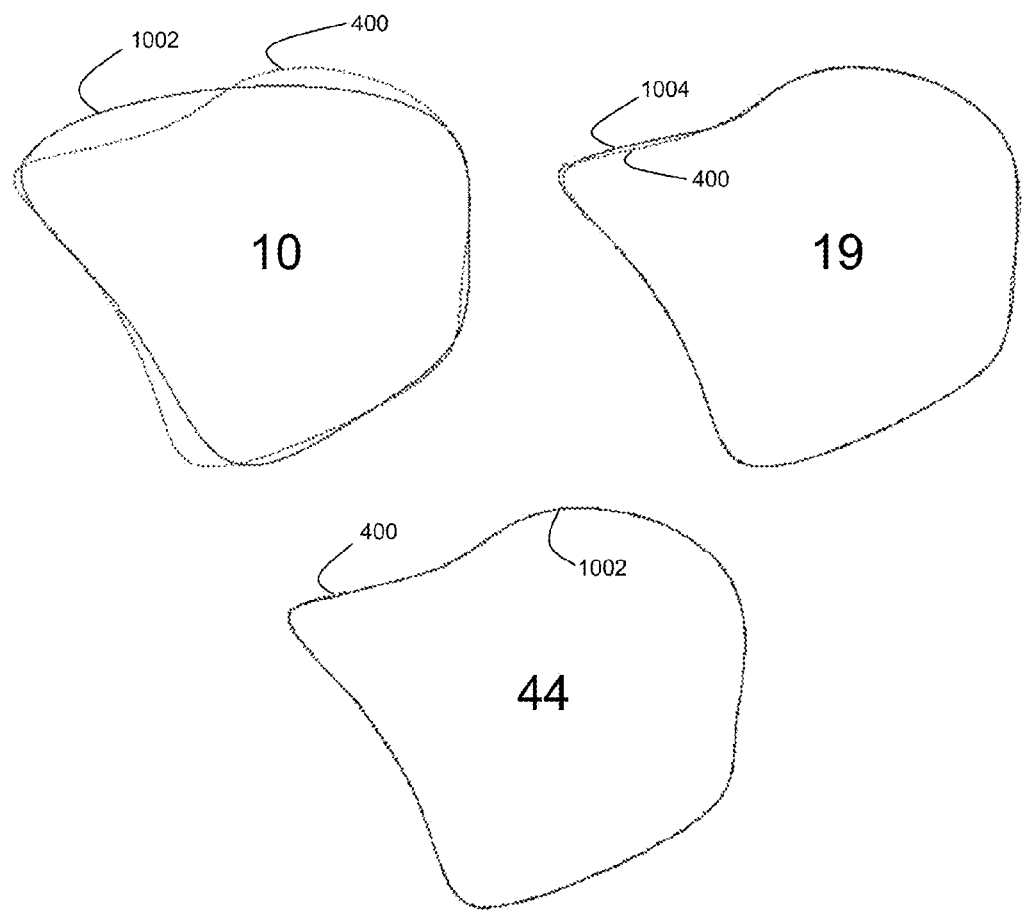
FIG. 10 depicts the exemplary contour of FIG. 4 reconstructed using B-spline interpolation for several different finite difference interval settings with respect to the scalar second derivative computation.

FIG. 10 shows the random shape 400 of FIG. 4 (shown with dotted lines in FIG. 10) reconstructed using B-spline interpolation for several interval settings. As with the reconstructions of FIG. 8, the number of points $Q_k$ for each reconstruction is set by the value of the finite distance interval and also depends on the shape complexity of the curve. For reconstructed contour 1002, the number of points $Q_k$ was 10. For reconstructed contour 1004, the number of points $Q_k$ was 19. For reconstructed contour 1006, the number of points $Q_k$ was 44. As can be seen from FIG. 10, by using more points $Q_k$, it is possible to achieve arbitrarily high accuracy. Also, as with the reconstructions of FIG. 8, it should be noted that given the original number of samples for this example (a total of 1,099 samples), the use of only 44 points represents a significant compression in the number of points $Q_k$ used for the B-spline interpolation while still providing good accuracy in the reconstruction. Optionally, user input can be used to define a setting for the finite difference interval used in the scalar second derivative computations. Thus, the finite difference interval size in the scalar second derivative calculation can serve as an adjustable tuning parameter which can be controlled to define a quality and efficiency for the contour reconstruction.

According to a third technique of point reduction for step 604, the shape-salient points are determined as a function of the DeBoor equal energy theorem. (See DeBoor, C., *A Practical Guide to Splines*, Springer, New York, 2001, the entire disclosure of which is incorporated herein by reference). With the DeBoor equal energy theorem, the total curvature of the entire curve is divided into s equal parts, and the sampled points are placed along the curve, at s non-uniform intervals, but in such a way as to divide the total curvature into equal parts.

The DeBoor theorem then measures the curvature as the k-th root of absolute value of the k-th derivative of the curve, $$|D^k C(u)|^{\frac{1}{k}} = \left|\frac{d^k}{du^k} C(u)\right|^{\frac{1}{k}}. \quad (13)$$

where $D^k C(u)$ denotes the derivative operator. The above-referenced work by DeBoor proves two instances of a theorem (Theorem II(20), Theorem XII(34)) that optimally places breakpoints (sample points) to interpolate a curve with minimum error. For a closed curve C(u) of length L such that 0≤u<L, one can define a set of arc length values $v_j$, j=1, . . . ,s such that points on C at those values evenly divide the total curvature. The total curvature K is $$K = \int_0^L |D^k C(u)|^{\frac{1}{k}} du \quad (14)$$

so that dividing it into s equal parts where the energy of any part is 1/s of the energy of the curve, or $$\int_{v_j}^{v_{j+1}} |D^k C(u)|^{\frac{1}{k}} du = \frac{1}{s} \int_0^L |D^k C(u)|^{\frac{1}{k}} du. \quad (15)$$

This measure is similar to the $\int (D^k C(u))^2 du$ "bending energy" curvature measure (see Wahba, G., Spline Models for Observational Data, SIAM (Society for Industrial and Applied Mathematics), Philadelphia, Pa., 1990, the entire disclosure of which is incorporated herein by reference) minimized by spline functions, so it is deemed appropriate to call the DeBoor technique described herein as an "equal energy" theorem or method.

Figure 11:
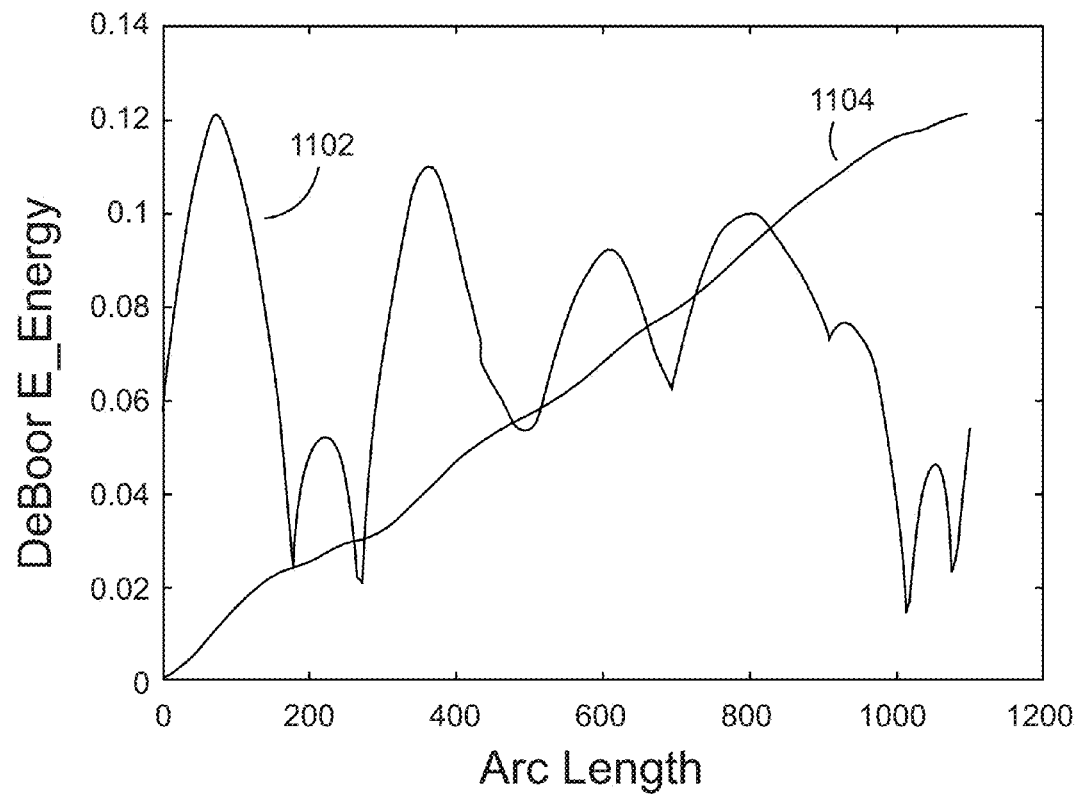
FIG. 11 depict a plot of the DeBoor energy versus arc length and a plot of the cumulative distribution of energy for the exemplary contour of FIG. 4.

FIG. 11 shows the plot 1102 of the DeBoor energy versus arc length, and a plot 1104 of the cumulative distribution of that energy for the random shape curve 400 of FIG. 4. In this plot, the finite differences were taken across 10% of the curve length.

Figure 12:
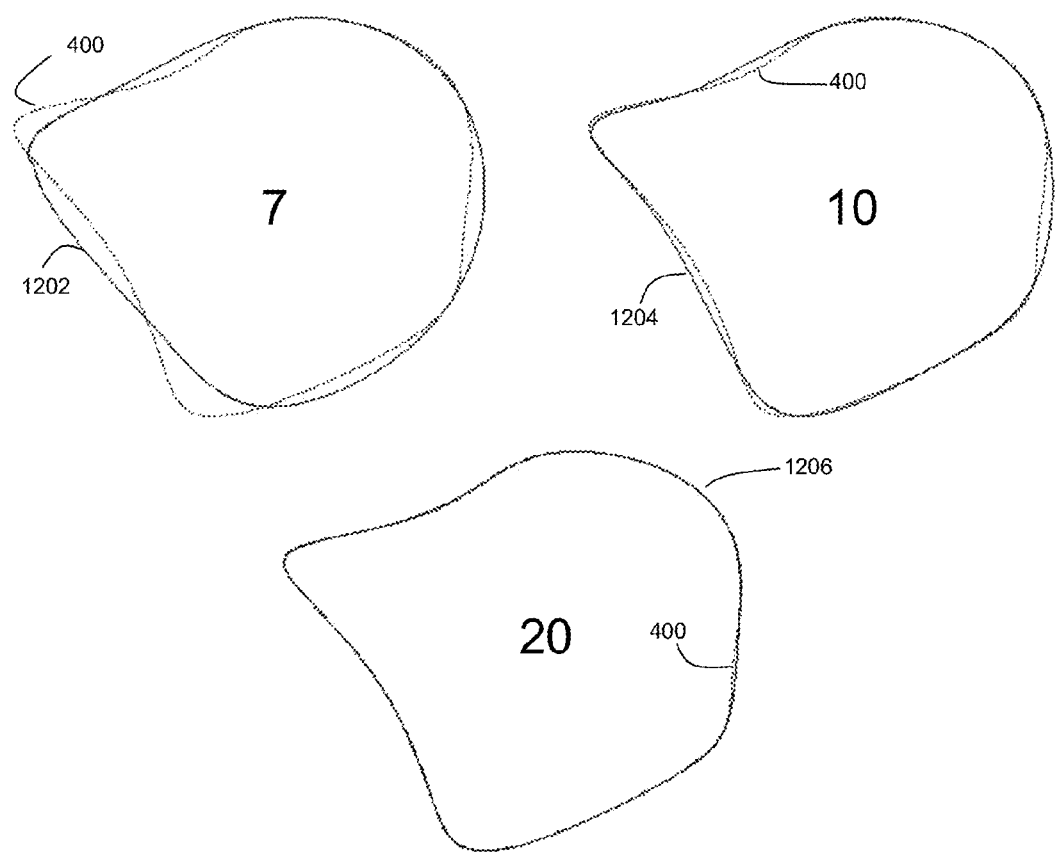
FIG. 12 depicts three DeBoor energy reconstructions of the exemplary contour of FIG. 4.

FIG. 12 shows three DeBoor energy reconstructions of the random shape curve 400 of FIG. 4 (shown as dotted lines in FIG. 12). The number of points $Q_k$ for each reconstruction is set by the chosen value for s. For larger values of s, larger values of $Q_k$ will result. For reconstructed contour 1202, the number of points $Q_k$ was 7. For reconstructed contour 1204, the number of points $Q_k$ was 10. For reconstructed contour 1206, the number of points $Q_k$ was 20. As can be seen from FIG. 12, the DeBoor equal energy function produces increasingly accurate reconstructions of the random figures as the number of points s is increased. Unlike the curvature and scalar second derivative methods described above, the DeBoor equal energy method fits a given number of points to the curve, instead of the number of points being set by the detection of underlying peaks in the curve. It should be noted, however, for shapes with a high shape complexity or a large value of the integral (14), it may be difficult to anticipate the appropriate number of $Q_k$. Optionally, user input can be used to define a setting for s used in the DeBoor computations. Thus, the interval size s in the DeBoor equal energy method can serve as an adjustable tuning parameter which can be controlled to define a quality and efficiency for the contour reconstruction.

Returning to FIG. 6, after a reduced set of points has been generated at step 604 for each initial set of input points 500, step 606 operates to re-order the points within each reduced set with respect to a frame of reference and a direction of rotation. Preferably, the frame of reference is set so that each reduced set's origin (i.e., first) point is at the cranial-most position on the contour. Also, the direction of rotation is preferably set to be clockwise, as determined by the method of Turning Tangents. (See the above-referenced work by DoCarmo). In this manner, for a given reduced point set, the origin point is set as the cranial-most point, and subsequent points are ordered based on a clockwise rotation starting from the origin point. However, it should be understood that other frames of reference and/or directions of rotation could be used.

Next, step 608 operates to find the points of intersection within each reduced set of re-ordered points on a desired new plane (e.g., a plane that is non-parallel to the at least one viewing plane for the contours defined by the reduced sets of input points). Preferably, step 608 operates to find the points within each reduced re-ordered point set that intersect a desired T plane.

After the points of intersection in the new plane (e.g., a T plane) are found, step 610 operates to generate a new contour in this new plane by ordering the points of intersection and interpolating through the points of intersection using B-spline interpolation as described above in Section III.

Thereafter, at step 612, a comparison can be made between the new contour generated at step 610 and a corresponding patient image in the same plane. Such a comparison can be made visually by a user. If the generated contour is deemed a "match" to the image (i.e., a close correspondence between the generated contour and the corresponding anatomy in the displayed image), then the generated contour can be archived for later use (step 614). If the generated contour is not deemed a match to the image, then process flow of FIG. 6 can begin anew with new input points, wherein these new input points perhaps define more contours than were previously used.

Figure 13A:
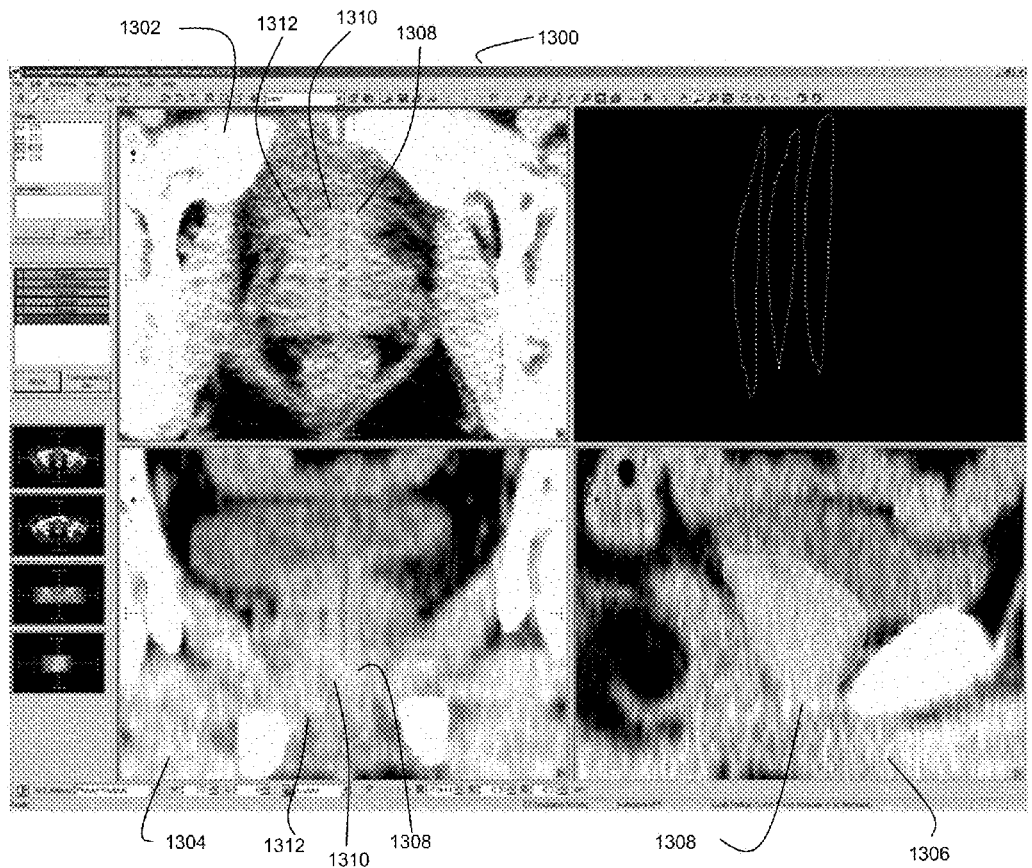
FIGS. 13(a)-(c) depict a graphical reconstruction of T contours using B-spline interpolation in accordance with an embodiment of the invention.
Figure 13B:
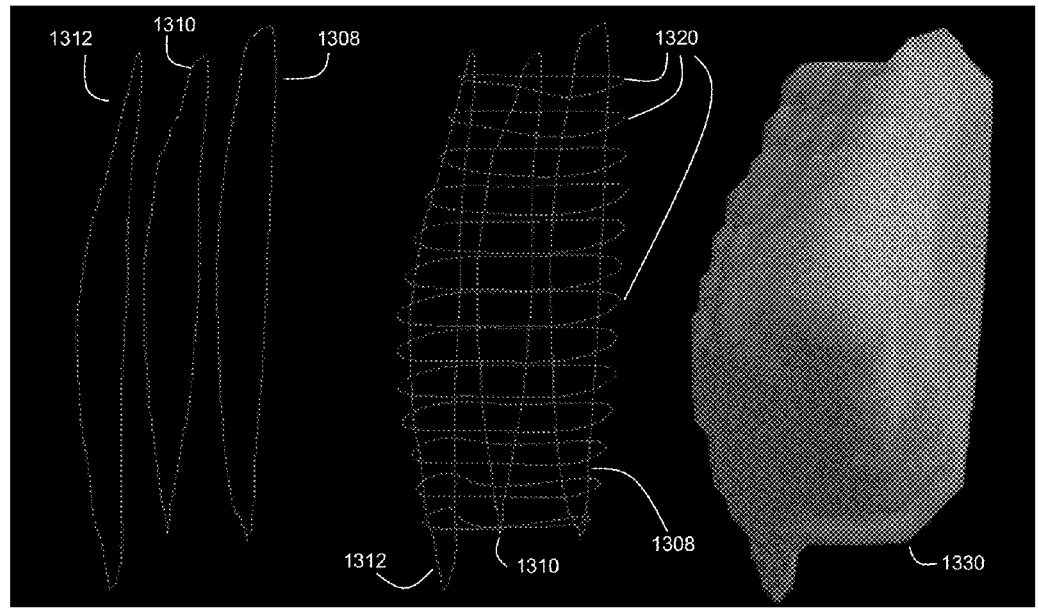
Figure 13C:
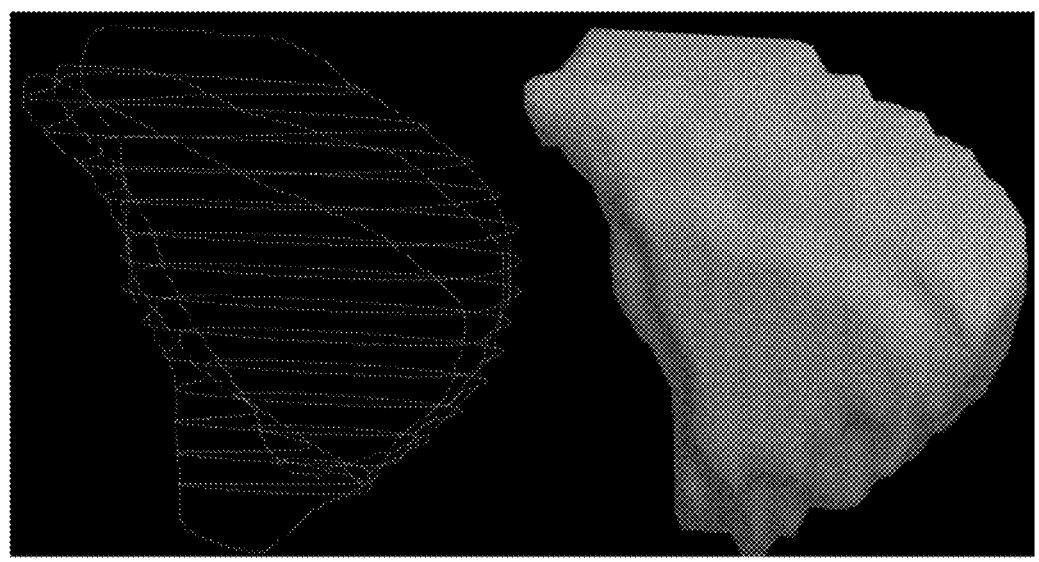

FIGS. 13(a)-(c) depict how a set of B-spline T contours can be generated from input points corresponding to three input S contours. FIG. 13(a) depicts a GUI 1300 through which a user can define contours within various CT image slices of a patient. Different frames of the GUI 1300 correspond to different viewing planes into the patient's CT data. Frame 1302 depicts a slice of image data in the T viewing plane. Frame 1304 depicts a slice of image data in the C viewing plane, and frame 1306 depicts a slice of image data in the S viewing plane. The user can navigate from slice-to-slice within the GUI 1300 using conventional software tools. Because the process flow of FIG. 6 allows the user to draw original contours for an anatomical region of interest in any viewing plane, the user can select the viewing plane(s) in which to draw the contours based on which viewing plane(s) most clearly depict the anatomical region of interest. In this example, the user has drawn three contours 1308, 1310, and 1312 in the S viewing plane. The corresponding footprints for these three S contours are shown in frames 1302 and 1304 for the T and C viewing planes respectively. Also, the upper right hand frame of GUI 1300 depicts perspective views of these three S contours. The process flow of FIG. 6 can be invoked to generate a plurality of T contours 1320 from the sampled points for the three S contours 1308, 1310, 1312. FIG. 13(b) depicts several of these generated T contours 1320. Each generated T contour 1320 corresponds to a T contour generated from B-spline interpolation as described in connection with FIG. 6 for a different T plane.

Furthermore, as can be seen in FIG. 13(b), the generated T contours wrap the three original S contours, and a 3D surface 1330 can be rendered from these S and T contours using a series of B-spline interpolations as described above. FIG. 13(c) depicts a rotated view of the contours and surface rendering from FIG. 13(b).

In the embodiment of FIG. 5(b), the input points 500 are representative of a plurality of any combination of T, S, and/or C contours. Furthermore, as described hereinafter, the software program executed by processor 502 in the FIG. 5(b) embodiment is configured to generate a 3D surface 506 from the input points 500. From this 3D surface 506, contours of any obliquity, including T contours, can be readily generated.

Figure 14:
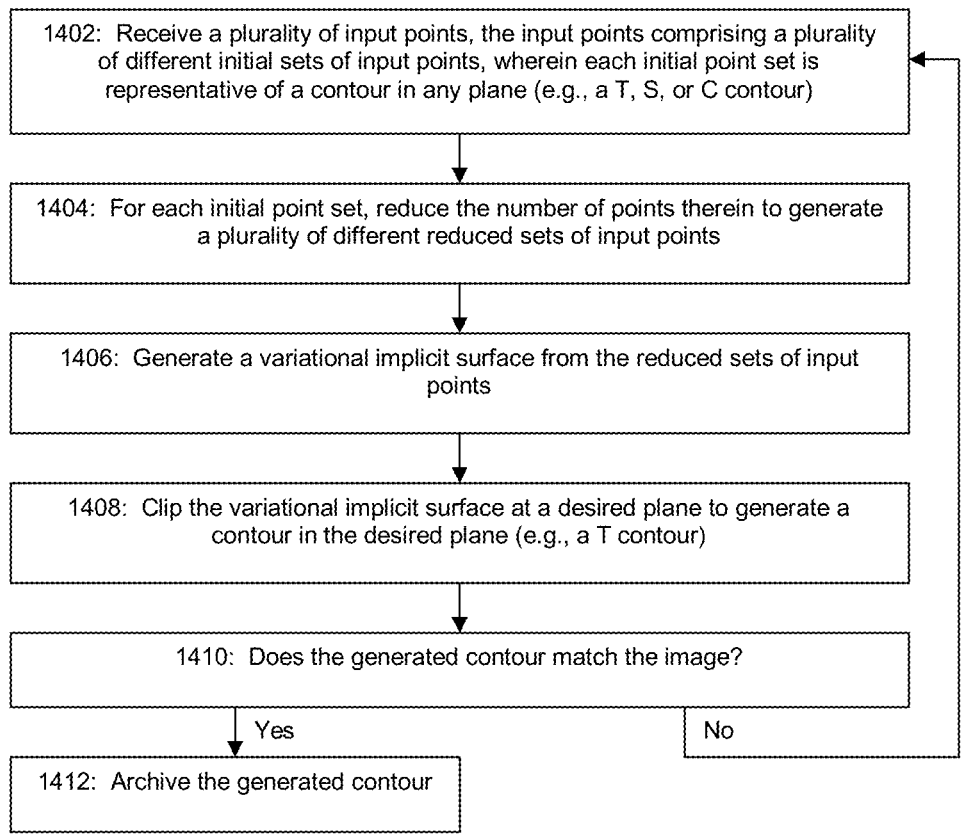
FIG. 14 depicts an exemplary process flow for generating a variational implicit surface from a plurality of input points that represent contours.

FIG. 14 depicts an exemplary process flow for the FIG. 5(b) embodiment. At step 1402, the software program receives the plurality of input points 500 as described above in connection with step 602 of FIG. 6. As with step 602, these input points 500 can be grouped as a plurality of different initial sets of data points 500, wherein each initial point set is representative of a different contour. It should be noted that for a preferred embodiment of the process flow of FIG. 6, the FIG. 6 process flow generates T contours from input contours in the S and/or C viewing planes. However, with a preferred embodiment of the process flow of FIG. 14, the input contours can be in any viewing plane, including T contours.

Next, at step 1404, each initial point set is processed to generate a reduced set of input points, as described above in connection with step 604 of FIG. 6. By compressing the number of points used to represent the different input contours, the computation of the variational implicit surface becomes practical. Without such compression of the contour representations, the computational time for generating the variational implicit surface from the contour representations requires an undue amount of time on conventional computing resources.

Thereafter, at step 1406, a variational implicit surface is generated from the reduced sets of data points. The variational implicit surface is a solution to the scattered data interpolation problem in which the goal is to determine a smooth function that passes through discrete data points. (See Turk and O'Brien, *Shape Transformation Using Variational Implicit Functions*, Proceedings of SIGGRAPH 99, Annual Conference Series, pp. 335-342, Los Angeles, Calif., August 1999, the entire disclosure of which is incorporated herein by reference). For a set of constraint points $\{c_1, \ldots, c_k\}$ with a scalar height $\{h_1, \ldots, h_k\}$ at each position, one can determine a function $f(x), x=(x,y,z)^T$ that passes through each $c_i$ such that $f(c_i)=h_i$. A variational solution that minimizes the so-called "bending energy" (see the above-referenced work by Turk and O'Brien) is the sum $$f(x) = \sum_{j=1}^{n} d_j \phi(x - c_j) + P(x) \tag{16}$$

over radial basis functions $\phi_j$ (described below) weighted by scalar coefficients $d_j$, and where $c_j$ are the constraint point locations and $P(x)$ is a degree one polynomial $$P(x) = p_0 + p_1 x + p_2 y \tag{17}$$

that accounts for constant and linear parts of the function $f(x)$. The radial basis functions for the 3D constraints appropriate for this problem are $$\phi(x) = |x^3|. \tag{18}$$

Solving for the constraints $h_i$ in terms of the known positions $$h_i = \sum_{j=1}^{n} d_j \phi(c_i - c_j) + P(c_i) \tag{19}$$

gives a linear system that for 3D constraints $c_i = (c_i^x, c_i^y, c_i^z)$ is $$\begin{bmatrix} \phi_{11} & \phi_{12} & \ldots & \phi_{1k} & 1 & c_1^x & c_1^y & c_1^z \\ \phi_{21} & \phi_{22} & \ldots & \phi_{2k} & 1 & c_2^x & c_2^y & c_2^z \\ \vdots & \vdots & & \vdots & 1 & \vdots & \vdots & \vdots \\ \phi_{k1} & \phi_{k2} & \ldots & \phi_{kk} & 1 & c_k^x & c_k^y & c_k^z \\ 1 & 1 & \ldots & 1 & 0 & 0 & 0 & 0 \\ c_1^x & c_2^x & \ldots & c_k^x & 0 & 0 & 0 & 0 \\ c_1^y & c_2^y & \ldots & c_k^y & 0 & 0 & 0 & 0 \\ c_1^z & c_2^z & \ldots & c_k^z & 0 & 0 & 0 & 0 \end{bmatrix} \begin{bmatrix} d_1 \\ d_2 \\ \vdots \\ d_k \\ p_0 \\ p_1 \\ p_2 \\ p_3 \end{bmatrix} = \begin{bmatrix} h_1 \\ h_2 \\ \vdots \\ h_k \\ 0 \\ 0 \\ 0 \\ 0 \end{bmatrix} \tag{20}$$

This system is symmetric and positive semi-definite, so there will always be a unique solution for the $d_j$ and the $p_1$. The solution can be obtained using LU decomposition. (See the above-referenced works by Press et al. and Golub and Van Loan). In a preferred embodiment, the implementation of LU decomposition can be the LAPACK implementation that is known in the art. (See Anderson et al., *LAPACK User's Guide, Third Edition*, SIAM—Society for Industrial and Applied Mathematics, Philadelphia, 1999, the entire disclosure of which is incorporated herein by reference).

A further feature of the variational implicit surface computation as described in the above-referenced work by Turk and O'Brien is the use of additional constraint points, located off the boundary along normals connecting with the on-boundary constraints, to more accurately and reliably interpolate the surface through the on-boundary constraints. In a preferred embodiment, the on-boundary constraints' $h_j$ values can be set to 0.0 and the off-boundary values can be set to 1.0. However, as should be understood, other values can be used in the practice of this embodiment of the invention.

Figure 15:
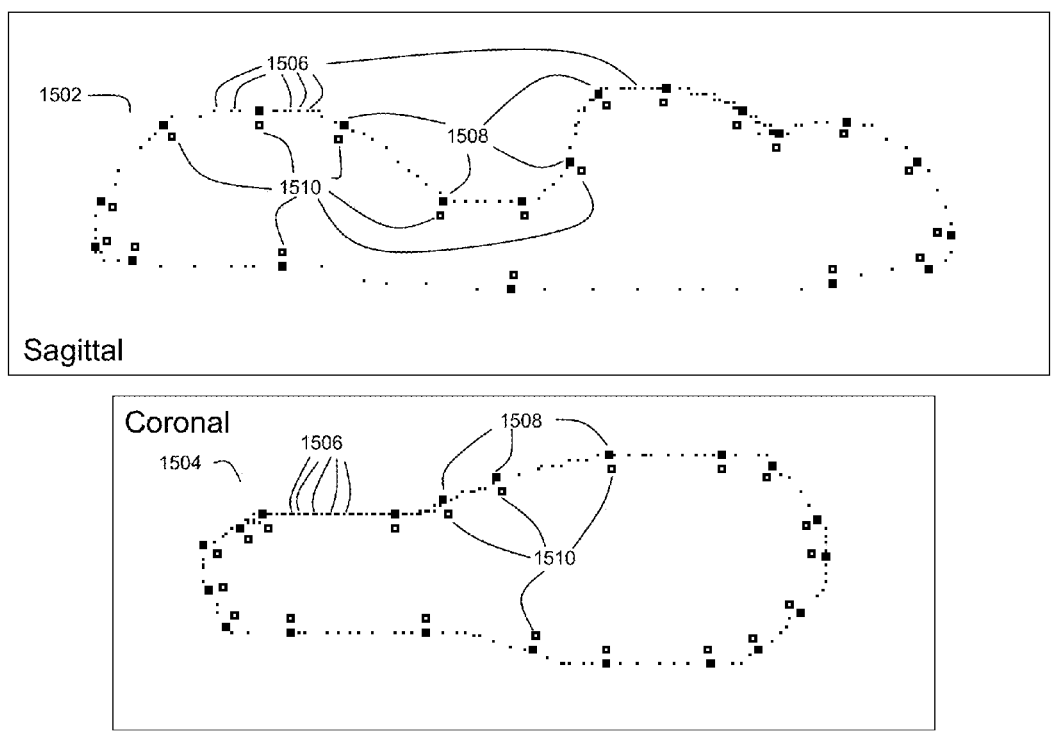
FIG. 15 depicts, for a pair of actual manually drawn contours, the non-uniform data sampling, the results of the second derivative shape analysis, and the construction of a complete set of constraints for input to an implicit function computation.

FIG. 15 demonstrates, for a pair of actual manually drawn contours 1502 and 1504, the non-uniform data sampling, the results of the DeBoor energy analysis using 20 points with both contours, and the construction of a complete set of constraints for input to the implicit function computation. FIG. 15 depicts the original contour points 1506 for an S contour 1502 and a C contour 1504. Also depicted in FIG. 15 are the shape-salient points 1508 (shown as the darker points along the contours) computed from the original points 1506 using the above-described DeBoor equal energy technique. Furthermore, FIG. 15 depicts the normals 1510 (shown as boxes) to the on-contour constraint points 1508. The implicit function constraint points would thus include both the on-contour shape-salient points 1508 and their corresponding normals 1510.

Performance of this solution depends partly on the form of the radial basis function $\phi(x)$ one uses, and on the size of the system parameter k (number of all constraint points). The performance of the LU solution of equation (20) can be done using different choices of $\phi$. (See Dinh, et al., *Reconstructing surfaces by volumetric regularization using radial basis functions*, IEEE Transactions on Pattern Analysis and Machine Intelligence, 24, pp. 1358-1371, 2002, the entire disclosure of which is incorporated herein by reference).

The function $|x^3|$ is monotonic increasing, meaning that the matrix in (20) has large off-diagonal values for all constraint point pairs $c_i, c_j, i \neq j$. To make the linear system perform more robustly, the above-referenced work by Dinh describes a modification of the system to make it more diagonally dominant by adding to the diagonal elements a set of scalar values $\lambda_i$ $$\begin{bmatrix} \phi_{11}+\lambda_1 & \phi_{12} & \ldots & \phi_{1k} & 1 & c_1^x & c_1^y & c_1^z \\ \phi_{21} & \phi_{22}+\lambda_2 & \ldots & \phi_{2k} & 1 & c_2^x & c_2^y & c_2^z \\ \vdots & \vdots & & \vdots & 1 & \vdots & \vdots & \vdots \\ \phi_{k1} & \phi_{k2} & \ldots & \phi_{kk}+\lambda_k & 1 & c_k^x & c_k^y & c_k^z \\ 1 & 1 & \ldots & 1 & 0 & 0 & 0 & 0 \\ c_1^x & c_2^x & \ldots & c_k^x & 0 & 0 & 0 & 0 \\ c_1^y & c_2^y & \ldots & c_k^y & 0 & 0 & 0 & 0 \\ c_1^z & c_2^z & \ldots & c_k^z & 0 & 0 & 0 & 0 \end{bmatrix} \begin{bmatrix} d_1 \\ d_2 \\ \vdots \\ d_k \\ p_0 \\ p_1 \\ p_2 \\ p_3 \end{bmatrix} = \begin{bmatrix} h_1 \\ h_2 \\ \vdots \\ h_k \\ 0 \\ 0 \\ 0 \\ 0 \end{bmatrix}. \tag{20}$$

A preferred embodiment uses values $\lambda_{Boundary}=0.001$ and $\lambda_{OffBoundary}=1.0$. However, it should be understood that other values could be used.

After solving for the $d_j$ and the $p_j$ in Equation (20), the implicit function in (16) can be evaluated to determine that set of points $\{x_i\}$ for which $f(x_i)=0$. (The zero-th level of $f(x)$ is that on which the boundary points lie). The method of Bloomenthal (see Bloomenthal, J., *An Implicit Surface*

*Polygonizer*, Graphics Gems IV, P. Heckbert, Ed., Academic Press, New York, 1994, the entire disclosure of which is incorporated herein by reference) can be used to track around the function and determine the locations of mesh nodes from which a 3D surface may be constructed. A closed surface constructed in this way can be termed a variational implicit surface. (See the above-referenced work by Turk and O'Brien).

At step 1408, that mesh can then be clipped by planes parallel to the xz-plane at the appropriate y-value(s) to produce the desired T contour(s) for display to the user. The mesh representation and clipping functionality can be performed using the VTK software system available from Kitware, Inc. of Clifton Park, N.Y. (See Schroeder et al., *The Visualization Toolkit*, $4^{th}$ Ed., Kitware, 2006, the entire disclosure of which is incorporated herein by reference).

Thereafter, as with steps 612 and 614 of FIG. 6, the generated contour can be compared to the image (step 1410) and archived if it sufficiently matches the anatomy of interest shown in the image (step 1412). If not a sufficient match, the process of FIG. 14 can begin anew.

As indicated, the main performance limitation for computing a variational implicit surface is the total number of constraints, and for k greater than a few thousand, the variational implicit surface computation takes too much time to be useful for real-time applications. However, the inventor herein believes that by reducing the number of constraint points used for computing the variational implicit surface via any of the compression operations described in connection with steps 1404 and 604 for contour representations, the computation of variational implicit surfaces will become practical for 3D medical contouring. Furthermore, a fortunate property of the variational implicit surface is its ability to forgive small mismatches in orthogonal contours that are required to intersect (because they are curves on the same surface) but do not because the user was unable to draw them carefully enough. For example, when the sampling interval in the Bloomenthal algorithm is set to the inter-T plane distance, the resulting surfaces are sampled at too coarse a level to reveal the small wrinkles in the actual surface, and the resulting T contours are not affected by the missed T/S/C intersections.

Figure 16:
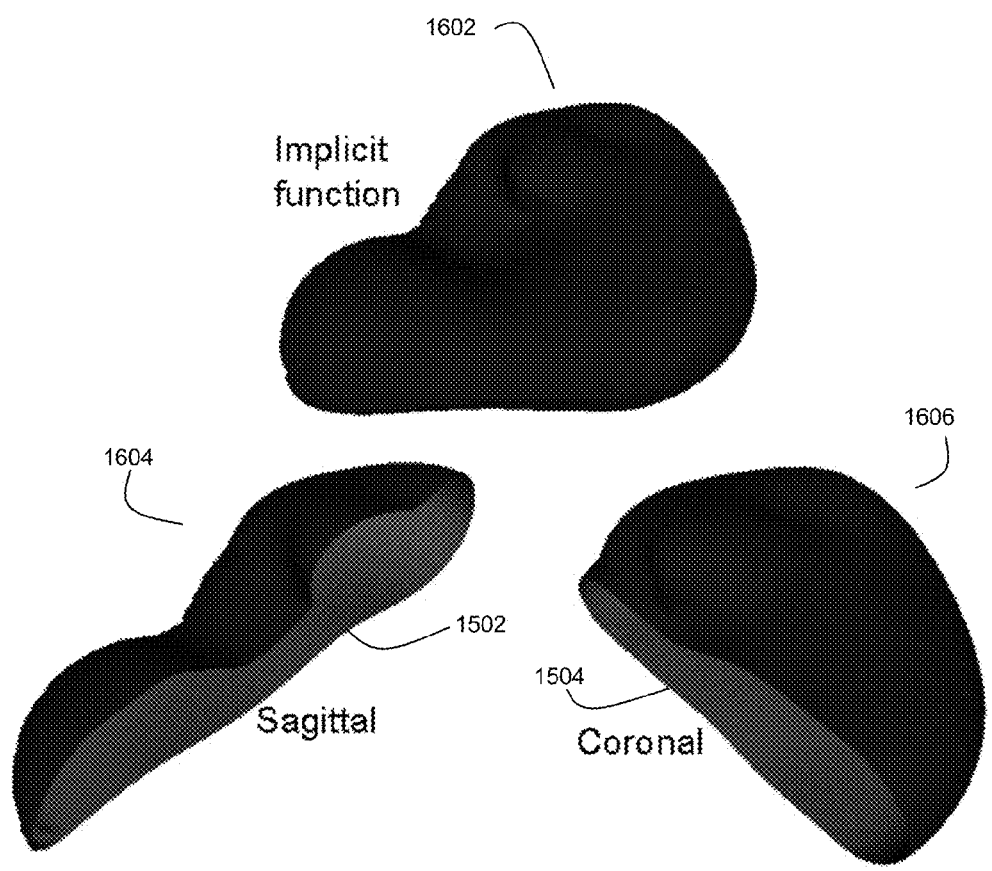
FIG. 16 depicts a variational implicit surface produced from the contours of FIG. 15.

FIG. 16 illustrates the variational implicit surface 1602 produced from the contours 1502 and 1504 in FIG. 15. FIG. 16 also depicts cutaways 1604 and 1606 that show the profiles of the contours 1502 and 1504, respectively, that were used to compute surface 1602.

Figure 17:
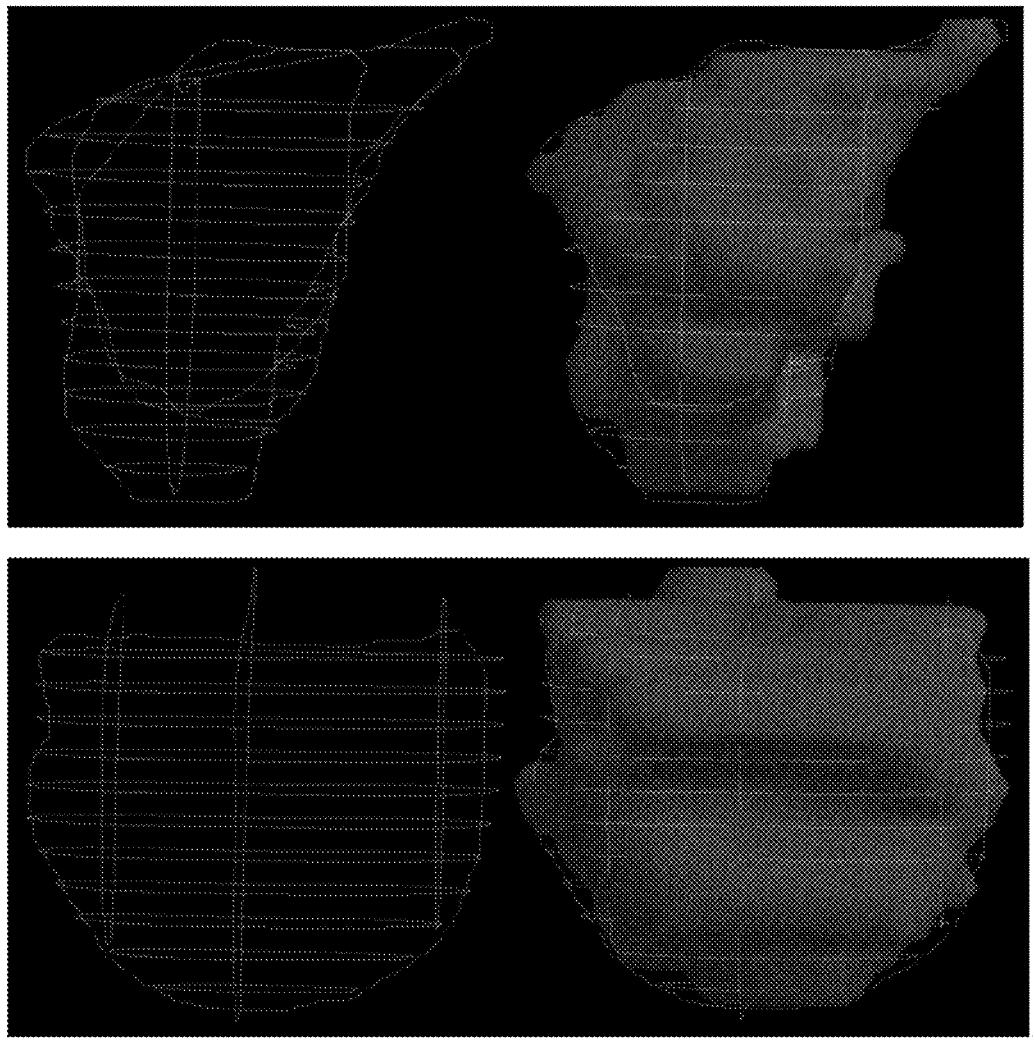
FIGS. 17-19(b) demonstrate the application of an exemplary variational implicit surface method in the contouring of the prostate, bladder, and rectum shown in FIG. 1.

FIGS. 17-19(b) demonstrate the application of the variational implicit surface method in the contouring of three organs shown in FIG. 1—the prostate 110, bladder 112, and rectum 114. In FIG. 17, variational implicit contours of the prostate 110 are shown in wireframe along with a conventional T-only contoured rendering. The top part of FIG. 17 depicts a left sagittal view of the variational implicit contours. The bottom part of FIG. 17 depicts a frontal (anterior) coronal view of the variational implicit contours. The wireframe for FIG. 17 was created using a single C contour and three S contours as inputs.

Figure 18:
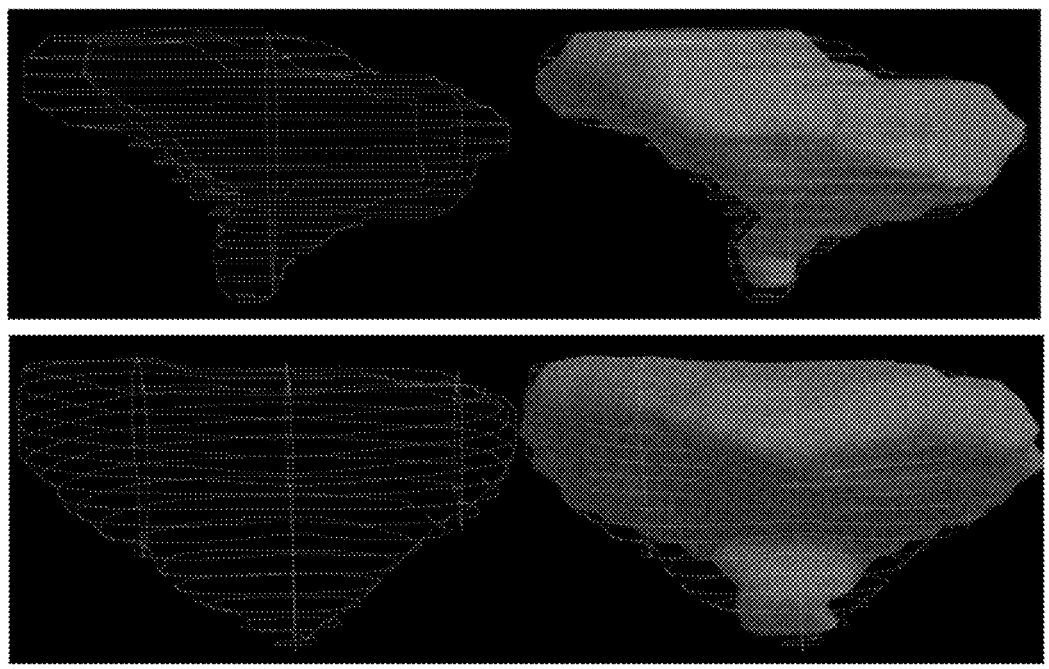

In FIG. 18, variational implicit contours of the bladder 112 are shown in wireframe along with a conventional T-only contoured rendering. The top portion of FIG. 18 depicts a right sagittal view of the variational implicit contours, and the bottom portion of FIG. 18 depicts a frontal (anterior) coronal view of the variational implicit contours. The wireframe for FIG. 18 was generated using a single C contour and three S contours as inputs.

Figure 19A:
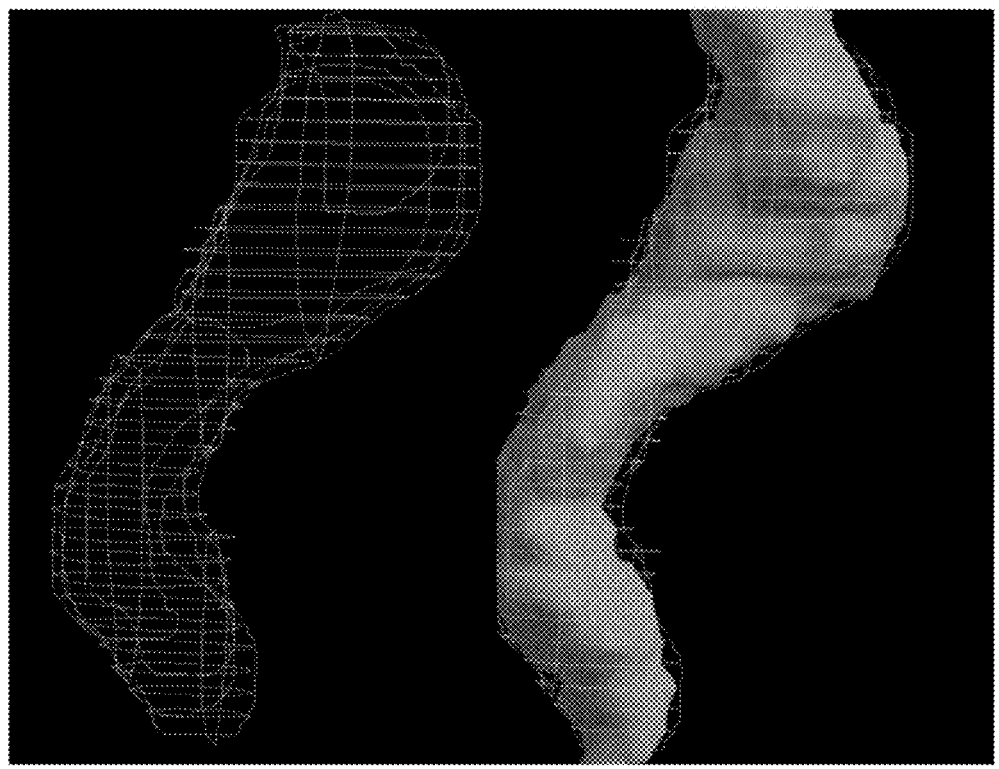
Figure 19B:
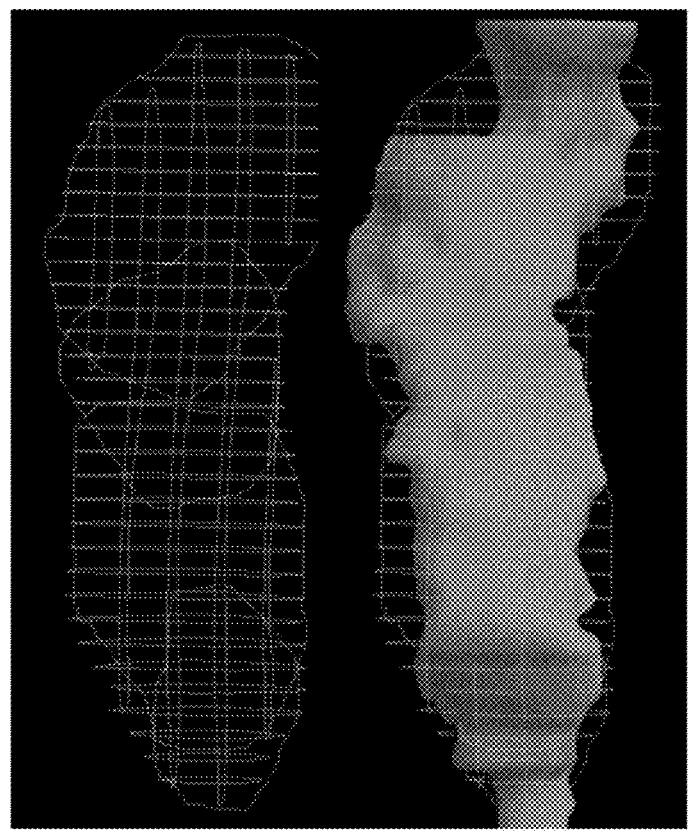

In FIGS. 19(a) and (b), variational implicit contours of the rectum 114 are shown in wireframe along with a conventional T-only contoured rendering. FIG. 19(a) depicts a left sagittal view of the variational implicit contours, and FIG. 19(b) depicts a frontal (anterior) coronal view of the variational implicit contours. The wireframe for FIGS. 19(a) and (b) was generated using a three C contours and five S contours as inputs.

As shown by FIGS. 17-19(b), the wireframes show good agreement with the conventionally drawn structures depicted at the right in these figures.

Figure 20:
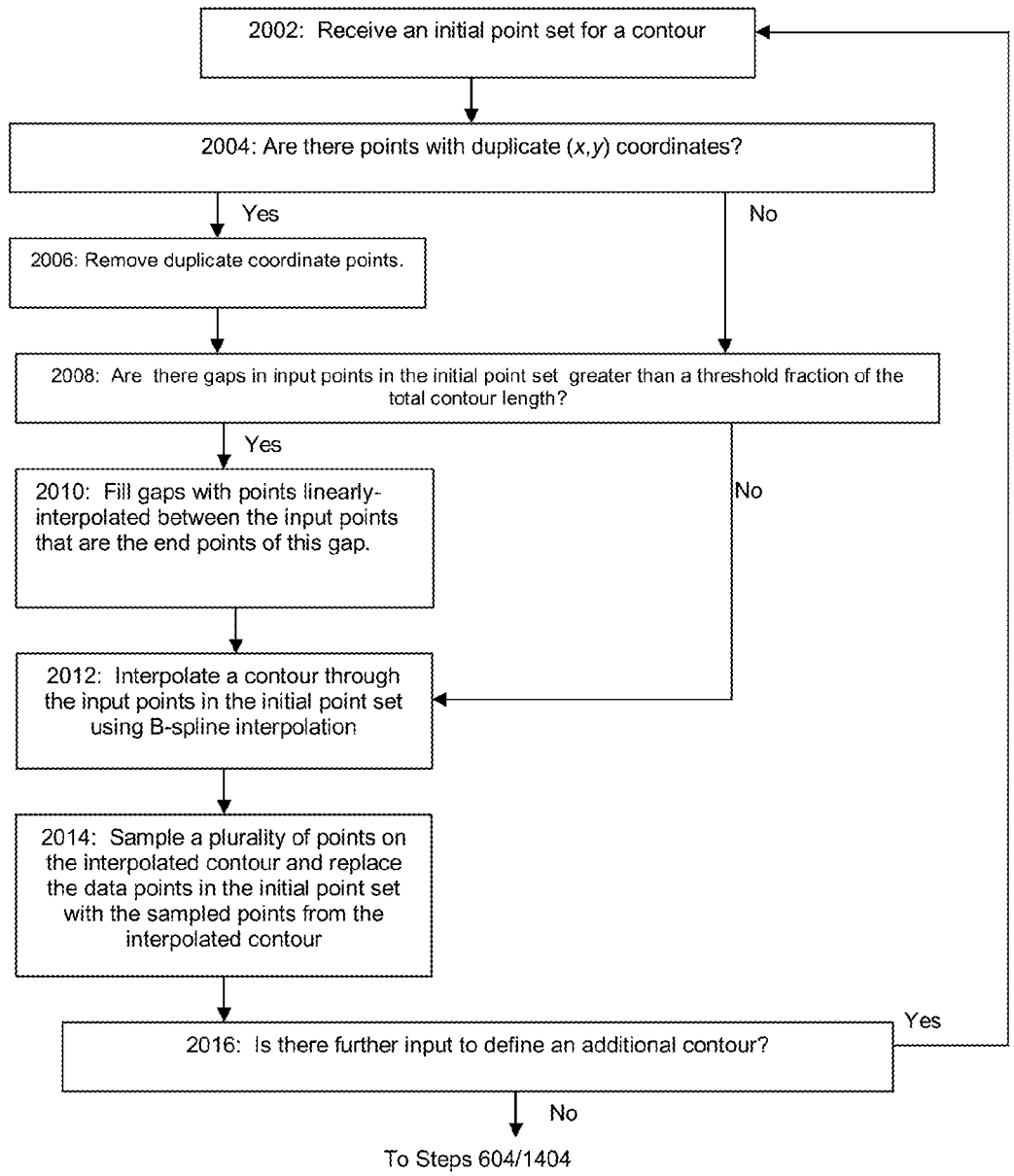
FIG. 20 depicts an exemplary process flow for operating on input point sets wherein one or more of the input sets contains a small number of contour data points.

It should also be noted that it may sometimes be the case wherein an initial set of input points corresponding to a contour contains only a small number of points, long gaps in the sequence of input points, and/or two or more points having the same coordinates (x,y). For example, both a small number of points and long gaps between points would likely result when a user defines a contour by only picking points at the vertices of a polygon that approximates the contour. Duplicate points can result when the user picks points along a contour because a graphics subsystem will sometimes interpret a single mouse button push as multiple events. In such instances, the process flow of FIG. 20 can be employed. At step 2002, an input point set for a contour is received. At step 2004, a check is made as to whether there are points with duplicate (x,y) coordinates. If yes at step 2004, the program proceeds to step 2006, where all duplicate points are removed from the contour's point set. If not, the input point set is retained and the process proceeds to step 2008. At step 2008, the program determines whether there are gaps in the input point set greater than a threshold fraction of the total contour length. If yes at step 2008, the program proceeds to step 2010 which augments the input point set by filling the gaps with points by linear interpolation between the input points at the end points of the gap. Optionally, the identities of the original points from the input point set and the identifies of the points added at step 2010 can be preserved so that the process of finding the shape-salient points within the point set will only allow the original points to be classified as shape-salient. If no at step 2008, then the program proceeds to step 2012. At step 2012, a contour is interpolated from the points in the input point set using B-spline interpolation as previously described in Section III. Thereafter, at step 2014, a plurality of points can be sampled from the interpolated contour, and these sampled points can be used to replace and/or augment the points in the input point set used to represent that contour. Step 2016 then operates to check whether the user has defined any additional contours. If not, the process flow can proceed to further complete the contouring operations (such as by proceeding to step 604 of FIG. 6 or step 1404 of FIG. 14). If the user has provided further input, the process can return to step 2002.

Figure 21:
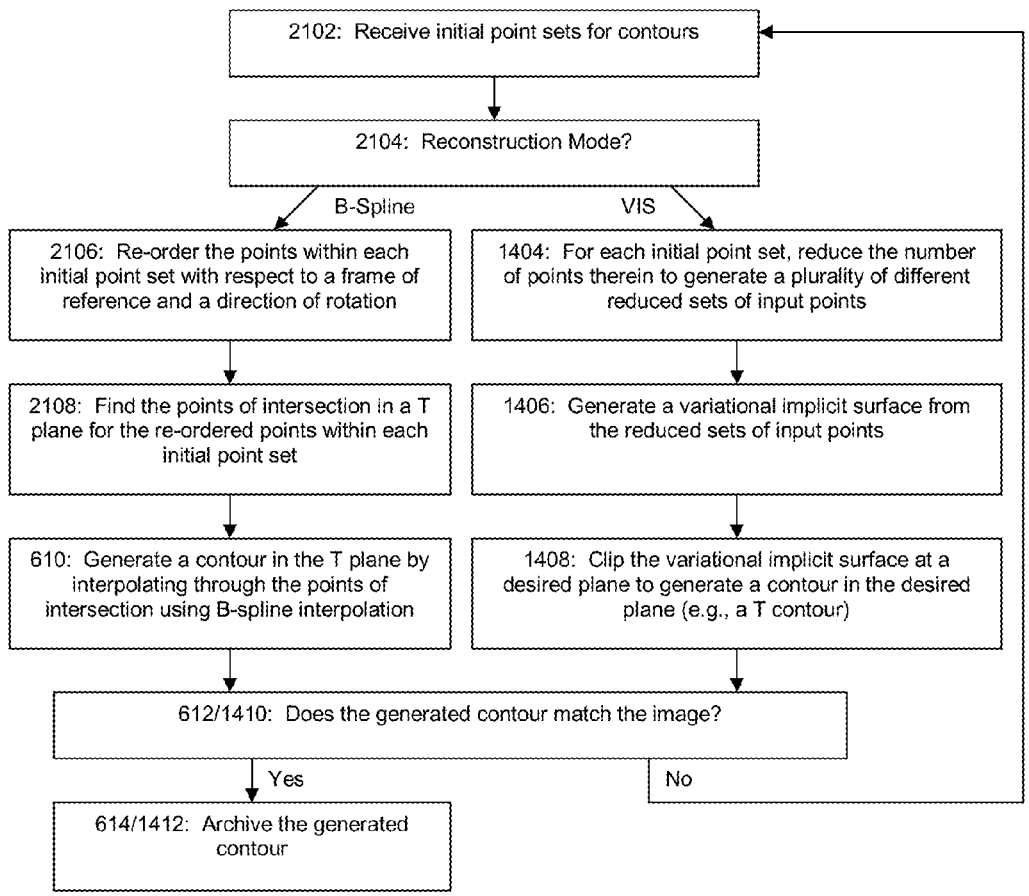
FIG. 21 depicts an exemplary process flow wherein both B-spline reconstruction of T contours and variational implicit surface generation from reduced data sets is employed.

It should also be noted that the B-spline interpolation and variational implicit surface generation can be combined in a single process flow as different modes of operation, as shown in FIG. 21. At step 2102, various input point sets for different contours are received. Then, at step 2104, the process flow decides which reconstruction mode should be used—e.g., a B-spline interpolation mode or a variational implicit surface mode. The decision at step 2104 can be made in any of a number of ways. For example, the B-spline interpolation mode can be used where only a small number (e.g., less than or equal to three) of S and/or C input contours have been defined, and the variational implicit surface mode can be used for other cases. Further still, a user can select which mode to be used via some form of user mode input.

If the B-spline interpolation mode is used, then steps 2106 and 2108 can be performed, wherein these steps correspond to steps 606 and 608 from FIG. 6, albeit without the preceding point reduction operation of step 604. However, it should also be noted that steps 2106 and 2108 could be replaced by steps 604, 606, and 608 if desired by a practitioner of this embodiment of the invention. Step 610 preferably operates as described above in connection with FIG. 6.

If the variational implicit surface mode is used, then steps 1404, 1406, and 1408 can be followed as described in connection with FIG. 14.

While the present invention has been described above in relation to its preferred embodiments, various modifications may be made thereto that still fall within the invention's scope. Such modifications to the invention will be recognizable upon review of the teachings herein. Accordingly, the full scope of the present invention is to be defined solely by the appended claims and their legal equivalents.

What is claimed is:

1. A computer-implemented method for generating a three-dimensional (3D) surface corresponding to a region of interest within an image, the method comprising:
   computing a plurality of curvature values for a first plurality of data points, the first plurality of data points being representative of a plurality of contours corresponding to the region of interest;
   defining a second plurality of data points as a function of the computed curvature values, the second plurality being less than the first plurality; and
   generating a 3D variational implicit surface representative of the region of interest based on the second plurality of data points; and
   wherein the method steps are performed by a processor.

2. The method of claim 1 wherein the defining step comprises the processor choosing as the second plurality of data points those points within first plurality of data points for which the computed curvature value satisfies a predetermined condition.

3. A computer-implemented method for generating a three-dimensional (3D) surface corresponding to a region of interest within an image, the method comprising:
   computing a plurality of scalar second derivative values for a first plurality of data points, the first plurality of data points being representative of a plurality of contours corresponding to the region of interest; and
   defining a second plurality of data points as a function of the computed scalar second derivative values, the second plurality being less than the first plurality; and
   generating a 3D variational implicit surface representative of the region of interest based on the second plurality of data points; and
   wherein the method steps are performed by a processor.

4. The method of claim 3 wherein the defining step comprises the processor choosing as the second plurality of data points those points within first plurality of data points for which the computed second scalar derivative value satisfies a predetermined condition.

5. A computer-implemented method for generating a three-dimensional (3D) surface corresponding to a region of interest within an image, the method comprising:
   generating a second plurality of data points from a first plurality of data points based on a DeBoor equal energy theorem function, the second plurality being less than the first plurality, the first plurality of data points being representative of a plurality of contours corresponding to the region of interest; and
   generating a 3D variational implicit surface representative of the region of interest based on the second plurality of data points; and
   wherein the method steps are performed by a processor.

6. The method of claim 5 wherein the step of generating the second plurality of points comprises:
   the processor reducing the first plurality of points to a plurality of shape-salient points based on the DeBoor equal energy theorem function.

7. The method of claim 5 wherein the generating step comprises:
   the processor computing a total curvature for each contour defined by the first plurality of data points;
   the processor dividing the total curvature for each contour defined by the first plurality of data points into a plurality s of equal energy parts; and
   the processor selecting as the second plurality of data points the end points of each of the s arc lengths that result from the dividing step.

8. The method of claim 5 further comprising:
   the processor controlling how many of the second plurality of data points are generated via a user-adjustable tuning parameter.

9. An apparatus for generating a three-dimensional (3D) surface corresponding to a region of interest within an image, the apparatus comprising:
   a processor configured to (1) generate a second plurality of data points from a first plurality of data points based on a DeBoor equal energy theorem function, the second plurality being less than the first plurality, the first plurality of data points being representative of a plurality of contours corresponding to the region of interest, and (2) generate a 3D variational implicit surface representative of the region of interest based on the second plurality of data points.

10. The apparatus of claim 9 wherein the processor is further configured to generate the second plurality of points by reducing the first plurality of points to a plurality of shape-salient points based on the DeBoor equal energy theorem function.

11. The apparatus of claim 9 wherein the processor is further configured to generate the second plurality of data points by (1) computing a total curvature for each contour defined by the first plurality of data points, (2) dividing the total curvature for each contour defined by the first plurality of data points into a plurality s of equal energy parts, and (3) selecting as the second plurality of data points the end points of each of the s arc lengths that result from the division.

12. The apparatus of claim 9 wherein the processor is further configured to control how many of the second plurality of data points are generated via a user-adjustable tuning parameter.

13. An apparatus for generating a three-dimensional (3D) surface corresponding to a region of interest within an image, the apparatus comprising:
   a processor configured to (1) compute a plurality of curvature values for a first plurality of input points, the first plurality of data points being representative of a plurality of contours corresponding to the region of interest, (2) define a second plurality of data points as a function of the computed curvature values, the second plurality being less than the first plurality, and (3) generate a 3D variational implicit surface representative of the region of interest based on the second plurality of data points.

14. The apparatus of claim 13 wherein the processor is further configured to define the second plurality of data points by choosing as the second plurality of data points those points within first plurality of data points for which the computed curvature value satisfies a predetermined condition.

15. An apparatus for generating a three-dimensional (3D) surface corresponding to a region of interest within an image, the apparatus comprising:

a processor configured to (1) compute a plurality of scalar second derivative values for a first plurality of input points, the first plurality of data points being representative of a plurality of contours corresponding to the region of interest, (2) define a second plurality of data points as a function of the computed scalar second derivative values, the second plurality being less than the first plurality, and (3) generate a 3D variational implicit surface representative of the region of interest based on the second plurality of data points.

16. The apparatus of claim 15 wherein the processor is further configured to define the second plurality of data points by choosing as the second plurality of data points those points within first plurality of data points for which the computed second scalar derivative value satisfies a predetermined condition.

17. A non-transitory computer-readable storage medium for generating a three-dimensional (3D) surface corresponding to a region of interest within an image, the computer-readable storage medium comprising:

a plurality of computer-executable instructions for (1) computing a plurality of curvature values for a first plurality of input points, the first plurality of data points being representative of a plurality of contours corresponding to the region of interest, (2) defining a second plurality of data points as a function of the computed curvature values, and (3) generating a 3D variational implicit surface representative of the region of interest based on the second plurality of data points, and wherein the instructions are resident on the non-transitory computer-readable storage medium.

18. The non-transitory computer-readable storage medium of claim 17 wherein the instructions further comprise computer-executable instructions for defining the second plurality of data points by choosing as the second plurality of data points those points within first plurality of data points for which the computed curvature value satisfies a predetermined condition.

19. A non-transitory computer-readable storage medium for generating a three-dimensional (3D) surface corresponding to a region of interest within an image, the computer-readable storage medium comprising:

a plurality of computer-executable instructions for (1) computing a plurality of scalar second derivative values for a first plurality of input points, the first plurality of data points being representative of a plurality of contours corresponding to the region of interest, (2) defining a second plurality of data points as a function of the computed scalar second derivative values, and (3) generating a 3D variational implicit surface representative of the region of interest based on the second plurality of data points, and wherein the instructions are resident on the non-transitory computer-readable storage medium.

20. The non-transitory computer-readable storage medium of claim 19 wherein the instructions further comprise computer-executable instructions for defining the second plurality of data points by choosing as the second plurality of data points those points within first plurality of data points for which the computed second scalar derivative value satisfies a predetermined condition.

21. A non-transitory computer-readable storage medium for generating a three-dimensional (3D) surface corresponding to a region of interest within an image, the computer-readable storage medium comprising:

a plurality of computer-executable instructions for (1) generating a second plurality of data points from a first plurality of data points based on a DeBoor equal energy theorem function, the second plurality being less than the first plurality, the first plurality of data points being representative of a plurality of contours corresponding to the region of interest, and (2) generating a 3D variational implicit surface representative of the region of interest based on the second plurality of data points, and wherein the instructions are resident on the non-transitory computer-readable storage medium.

22. The non-transitory computer-readable storage medium of claim 21 wherein the instructions further comprise computer-executable instructions for generating the second plurality of points by reducing the first plurality of points to a plurality of shape-salient points based on the DeBoor equal energy theorem function.

23. The non-transitory computer-readable storage medium of claim 21 wherein the instructions further comprise computer-executable instructions for generating the second plurality of data points by (1) computing a total curvature for each contour defined by the first plurality of data points, (2) dividing the total curvature for each contour defined by the first plurality of data points into a plurality s of equal energy parts, and (3) selecting as the second plurality of data points the end points of each of the s arc lengths that result from the division.

24. The non-transitory computer-readable storage medium of claim 21 wherein the instructions further comprise computer-executable instructions for controlling how many of the second plurality of data points are generated via a user-adjustable tuning parameter.

* * * * *